US012637075B2

(12) United States Patent
Lin et al.

(10) Patent No.: US 12,637,075 B2
(45) Date of Patent: May 26, 2026

(54) SAFE OCCLUSION-AWARE COOPERATIVE ADAPTIVE CRUISE CONTROL UNDER ENVIRONMENTAL INTERFERENCE

(71) Applicants: University of Washington, Seattle, WA (US); University of Portland, Portland, OR (US)

(72) Inventors: Yudong Lin, Seattle, WA (US); Santosh Devasia, Seattle, WA (US); Brian Fabien, Portland, OR (US)

(73) Assignees: University of Washington, Seattle, WA (US); University of Portland, Portland, OR (US)

( * ) Notice: Subject to any disclaimer, the term of this patent is extended or adjusted under 35 U.S.C. 154(b) by 134 days.

(21) Appl. No.: 18/691,349

(22) PCT Filed: Sep. 9, 2022

(86) PCT No.: PCT/US2022/043130
§ 371 (c)(1),
(2) Date: Mar. 12, 2024

(87) PCT Pub. No.: WO2023/043684
PCT Pub. Date: Mar. 23, 2023

(65) Prior Publication Data
US 2025/0136112 A1 May 1, 2025

Related U.S. Application Data

(60) Provisional application No. 63/244,140, filed on Sep. 14, 2021.

(51) Int. Cl.
*B60W 30/165* (2020.01)
*B60W 10/06* (2006.01)
*G08G 1/00* (2006.01)

(52) U.S. Cl.
CPC .......... *B60W 30/165* (2013.01); *B60W 10/06* (2013.01); *G08G 1/22* (2013.01);
(Continued)

(58) Field of Classification Search
CPC ............... B60W 30/165; B60W 10/06; B60W 2420/403; B60W 2420/408;
(Continued)

(56) References Cited

U.S. PATENT DOCUMENTS 9,645,579 B2  5/2017  Switkes
9,821,813 B2  11/2017  Chandraker
(Continued)

FOREIGN PATENT DOCUMENTS

WO       2020205597       10/2020

OTHER PUBLICATIONS

C. Bergenhem, S. Shladover, E. Coelingh, C. Englund, and S. Tsugawa, "Overview of platooning systems," in Proceedings of the 19th ITS World Congress, Oct 22-26, Vienna, Austria (2012), pp. 1-7.
(Continued)

*Primary Examiner* — Ashley L Redhead, Jr.
(74) *Attorney, Agent, or Firm* — Christensen O'Connor Johnson Kindness PLLC

(57) ABSTRACT

In some embodiments, a method of controlling speed of an ego vehicle in a vehicle platoon is provided. Cooperative adaptive cruise control (CACC) commands based on at least one of a vehicle-to-vehicle communication control received from a preceding vehicle and a feedback control based on a sensor output of a long-range sensor of the ego vehicle are provided to a speed controller. In response to detecting an occluded state, a minimum spacing value and a minimum relative velocity value between the ego vehicle and the preceding vehicle are determined based on information
(Continued)

received before the detection of the occluded state; a safety speed based on the minimum spacing value and the minimum relative velocity value is determined; and an occluded adaptive cruise control command is provided to the speed controller to maintain a speed of the ego vehicle that is less than or equal to the safety speed.

17 Claims, 23 Drawing Sheets

(52) U.S. Cl.
CPC . *B60W 2420/403* (2013.01); *B60W 2420/408* (2024.01); *B60W 2554/4041* (2020.02); *B60W 2554/804* (2020.02); *B60W 2556/65* (2020.02); *B60W 2720/10* (2013.01); *B60W 2754/30* (2020.02); *B60W 2754/50* (2020.02)

(58) Field of Classification Search
CPC ... B60W 2554/4041; B60W 2554/804; B60W 2556/65; B60W 2720/10; B60W 2754/30; B60W 2754/50; B60W 2554/406; G08G 1/22; G08G 1/163; G08G 1/167
See application file for complete search history.

(56) References Cited

U.S. PATENT DOCUMENTS

| | | | | |
|---|---|---|---|---|
| 10,137,890 | B2 | 11/2018 | Sakai | |
| 10,358,131 | B2 | 7/2019 | Van Nunen | |
| 10,627,812 | B2 | 4/2020 | Eggert | |
| 11,022,981 | B2 * | 6/2021 | Borhan | G08G 1/161 |
| 11,669,108 | B2 | 6/2023 | Laws | |
| 2017/0102705 | A1 | 4/2017 | Silvlin | |
| 2018/0231974 | A1 * | 8/2018 | Eggert | B60W 30/085 |
| 2020/0125117 | A1 | 4/2020 | Switkes | |
| 2020/0175880 | A1 * | 6/2020 | Ibrahim | G08G 1/0129 |
| 2020/0201356 | A1 | 6/2020 | Schuh | |
| 2021/0171030 | A1 | 6/2021 | Lee | |
| 2021/0197858 | A1 * | 7/2021 | Zhang | G08G 1/161 |
| 2022/0126864 | A1 * | 4/2022 | Moustafa | B60W 40/09 |
| 2023/0073287 | A1 * | 3/2023 | Iba | B60W 30/143 |

OTHER PUBLICATIONS

A. Alam, A. Gattami, and K. H. Johansson, "An experimental study on the fuel reduction potential of heavy duty vehicle platooning," in 13th international IEEE conference on intelligent transportation systems. IEEE, 2010, pp. 306-311.

C. Nowakowski, J. O'Connell, S. E. Shladover, and D. Cody, "Cooperative adaptive cruise control: Driver acceptance of following gap settings less than one second," in Proceedings of the Human Factors and Ergonomics Society Annual Meeting, vol. 54, No. 24. SAGE Publications Sage CA: Los Angeles, CA, 2010, pp. 2033-2037.

S. E. Shladover, D. Su, and X.-Y. Lu, "Impacts of cooperative adaptive cruise control on freeway traffic flow," Transportation Research Record, vol. 2324, No. 1, pp. 63-70, 2012.

G. Marsden, M. McDonald, and M. Brackstone, "Towards an understanding of adaptive cruise control," Transportation Research Part C: Emerging Technologies, vol. 9, No. 1, pp. 33-51, 2001.

S. E. Shladover, C. Nowakowski, X.-Y. Lu, and R. Ferlis, "Cooperative adaptive cruise control: Definitions and operating concepts," Transportation Research Record, vol. 2489, No. 1, pp. 145-152, 2015.

Q. Chen, Y. Xie, S. Guo, J. Bai, and Q. Shu, "Sensing system of environmental perception technologies for driverless vehicle: A review of state of the art and challenges," Sensors and Actuators A: Physical, p. 112566, 2021.

J. Van Brummelen, M. O'Brien, D. Gruyer, and H. Najjaran, "Autonomous vehicle perception: The technology of today and tomorrow," Transportation research part C: emerging technologies, vol. 89, pp. 384-406, 2018.

C. Yan, W. Xu, and J. Liu, "Can you trust autonomous vehicles: Contactless attacks against sensors of self-driving vehicle," Def Con, vol. 24, No. 8, p. 109, 2016.

M. Sun, A. Al-Hashimi, M. Li, and R. Gerdes, "Impacts of constrained sensing and communication based attacks on vehicular platoons," IEEE transactions on vehicular technology, vol. 69, No. 5, pp. 4773-4787, 2020.

A. Alipour-Fanid, M. Dabaghchian, and K. Zeng, "Impact of jamming attacks on vehicular cooperative adaptive cruise control systems," IEEE transactions on vehicular technology, vol. 69, No. 11, pp. 12679-12693, 2020.

A. Alipour-Fanid, M. Dabaghchian, H. Zhang, and K. Zeng, "String stability analysis of cooperative adaptive cruise control under jamming attacks," in 2017 IEEE 18th International Symposium on High Assurance Systems Engineering (HASE). IEEE, 2017, pp. 157-162.

J. Ploeg, E. Semsar-Kazerooni, G. Lijster, N. van de Wouw, and H. Nijmeijer, "Graceful degradation of cacc performance subject to unreliable wireless communication," in 16th International IEEE Conference on Intelligent Transportation Systems (ITSC 2013). IEEE, 2013, pp. 1210-1216.

C. Wu, Y. Lin, and A. Eskandarian, "Cooperative adaptive cruise control with adaptive kalman filter subject to temporary communication loss," IEEE Access, vol. 7, pp. 93558-93568, 2019.

J. Hoffman, M. Spranger, D. Gohring, and M. Jungel, "Making use of what you don't see: Negative information in markov localization," in 2005 IEEE/RSJ International Conference on Intelligent Robots and Systems. IEEE, 2005, pp. 2947-2952.

C.-Z. Liu, L. Li, J.-W. Yong, F. Muhammad, S. Cheng, and Q. Wu, "An innovative adaptive cruise control method with packet dropout," IEEE Transactions on Intelligent Transportation Systems, 2020, pp. 7102-7114.

W. Chung, S. Kim, M. Choi, J. Choi, H. Kim, C.-b. Moon, and J.-B. Song, "Safe navigation of a mobile robot considering visibility of environment," IEEE Transactions on Industrial Electronics, vol. 56, No. 10, pp. 3941-3950, 2009.

E. Galceran, E. Olson, and R. M. Eustice, "Augmented vehicle tracking under occlusions for decision-making in autonomous driving," in 2015 IEEE/RSJ International Conference on Intelligent Robots and Systems (IROS). IEEE, 2015, pp. 3559-3565.

M.-Y. Yu, R. Vasudevan, and M. Johnson-Roberson, "Occlusion-aware risk assessment for autonomous driving in urban environments," IEEE Robotics and Automation Letters, vol. 4, No. 2, pp. 2235-2241, 2019.

E. Debada, A. Ung, and D. Gillet, "Occlusion-aware motion planning at roundabouts," IEEE Transactions on Intelligent Vehicles, vol. 6, No. 2, pp. 276-287, 2020.

A. Palffy, J. F. Kooij, and D. M. Gavrila, "Occlusion aware sensor fusion for early crossing pedestrian detection," in 2019 IEEE Intelligent Vehicles Symposium (IV). IEEE, 2019, pp. 1768-1774.

S. Kim and M. Kim, "Occluded pedestrian classification using gradient patch and convolutional neural networks," in Advances in Computer Science and Ubiquitous Computing. Springer, 2016, pp. 198-204.

L. Sun, W. Zhan, C.-Y. Chan, and M. Tomizuka, "Behavior planning of autonomous cars with social perception," in 2019 IEEE Intelligent Vehicles Symposium (IV). IEEE, 2019, pp. 207-213.

P. F. Orzechowski, A. Meyer, and M. Lauer, "Tackling occlusions & limited sensor range with set-based safety verification," in 2018 21st International Conference on Intelligent Transportation Systems (ITSC). IEEE, 2018, pp. 1729-1736.

M. Althoff and S. Magdici, "Set-based prediction of traffic participants on arbitrary road networks," IEEE Transactions on Intelligent Vehicles, vol. 1, No. 2, pp. 187-202, 2016.

Y. Yoshihara, Y. Morales, N. Akai, E. Takeuchi, and Y. Ninomiya, "Autonomous predictive driving for blind intersections," in 2017 IEEE/RSJ International Conference on Intelligent Robots and Systems (IROS). IEEE, 2017, pp. 3452-3459.

(56) References Cited

OTHER PUBLICATIONS

P. A. Ioannou and C.-C. Chien, "Autonomous intelligent cruise control," IEEE Transactions on Vehicular technology, vol. 42, No. 4, pp. 657-672, 1993.

Y.-L. Chen, K.-Y. Shen, and S.-C. Wang, "Forward collision warning system considering both time-to-collision and safety braking distance," in 2013 IEEE 8th Conference on Industrial Electronics and Applications (ICIEA). IEEE, 2013, pp. 972-977.

N. Kudarauskas, "Analysis of emergency braking of a vehicle," Transport, vol. 22, No. 3, pp. 154-159, 2007.

S. H. Fairclough, A. J. May, and C. Carter, "The effect of time headway feedback on following behaviour," Accident Analysis & Prevention, vol. 29, No. 3, pp. 387-397, 1997.

S. Boyd, S. P. Boyd, and L. Vandenberghe, "Convex optimization," Cambridge university press, 2004, pp. 1-714.

F. Adegbohun, A. von Jouanne, B. Phillips, E. Agamloh, and A. Yokochi, "High performance electric vehicle powertrain modeling, simulation and validation," Energies, vol. 14, No. 5, p. 1493, 2021.

Wang, C., et al., "Cooperative Adaptive Cruise Control for Connected Autonomous Vehicles by Factoring Communication-Related Constraints," Transportation Research Procedia vol. 38, 2019, pp. 242-262.

Ploeg, J., et al., "Graceful Degradation of Cooperative Adaptive Cruise Control," IEEE Transactions on Intelligent Transportation Systems, vol. 16, No. 1, pp. 488-497, Sep. 2014, doi: 10.1109/TITS.2014.2349498.

Van Nunen, E., et al., "Robust model predictive cooperative adaptive cruise control subject to V2V impairments," 2017 IEEE 20th International Conference on Intelligent Transportation Systems (ITSC), Yokohama, Japan, 2017, pp. 1-8, doi: 10.1109/ITSC.2017.8317758.

Razzaghpour et al.,"Impact of Communication Loss on MPC based Cooperative Adaptive Cruise Control and Platooning," 2021 IEEE 94th Vehicular Technology Conference (VTC2021-Fall), Norman, OK, USA, 2021, pp. 01-07, doi: 10.1109/VTC2021-Fall52928.2021.9625177.

Sawant, J., et al., "Robust Control of Cooperative Adaptive Cruise Control in the Absence of Information About Preceding Vehicle Acceleration," IEEE Transactions on Intelligent Transportation Systems, vol. 22, No. 9, pp. 5589-5598, Sep. 2021, doi: 10.1109/TITS.2020.2987984.

Rodrigues da Silva, et al., "Safety Certified Cooperative Adaptive Cruise Control under Unreliable Inter-vehicle Communications," Sep. 23, 2016, doi: arXiv:1609.07501, pp. 1-8.

* cited by examiner

Figure 7A:
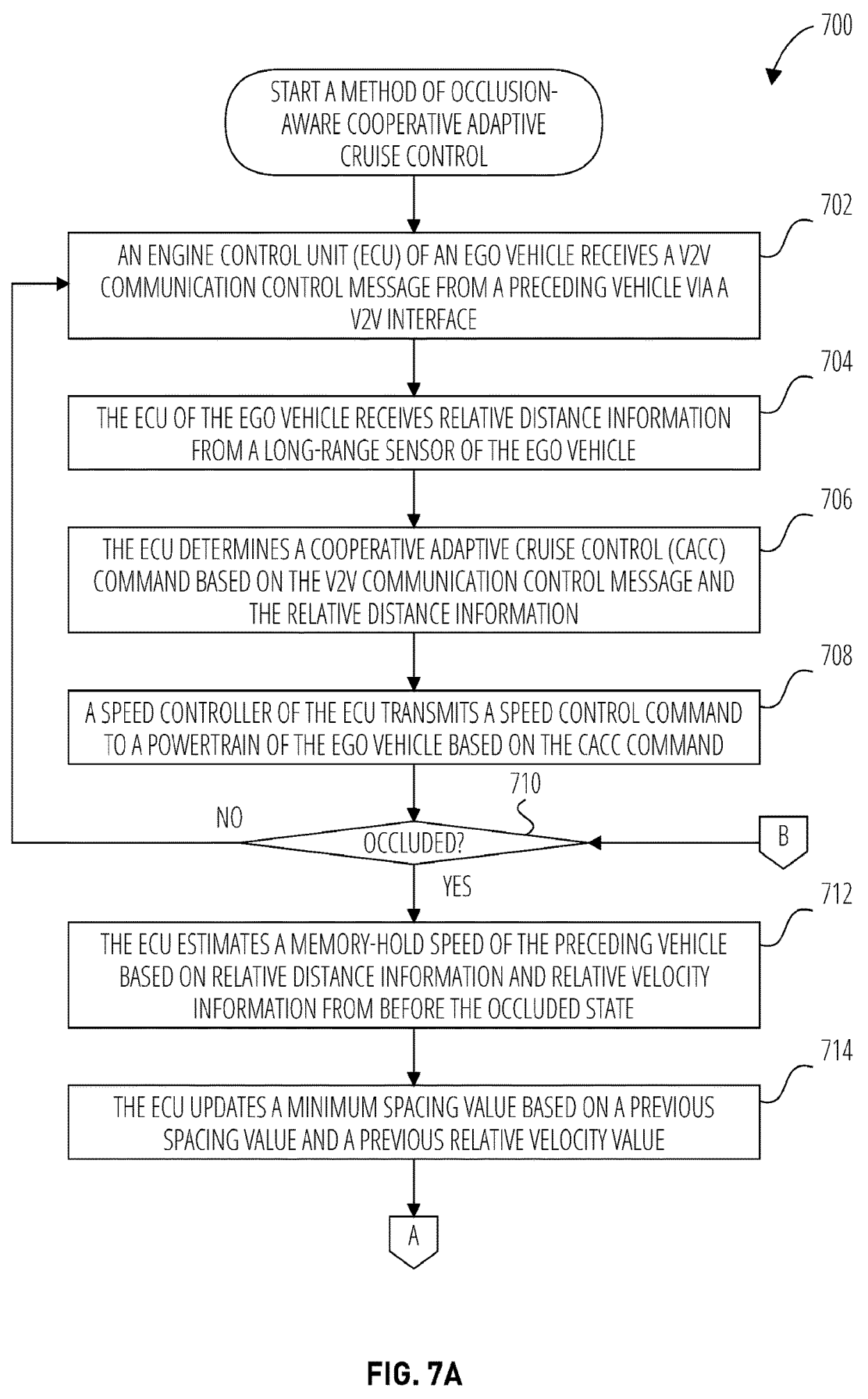

700

START A METHOD OF OCCLUSION-
AWARE COOPERATIVE ADAPTIVE
CRUISE CONTROL

702

AN ENGINE CONTROL UNIT (ECU) OF AN EGO VEHICLE RECEIVES A V2V
COMMUNICATION CONTROL MESSAGE FROM A PRECEDING VEHICLE VIA A
V2V INTERFACE

704

THE ECU OF THE EGO VEHICLE RECEIVES RELATIVE DISTANCE INFORMATION
FROM A LONG-RANGE SENSOR OF THE EGO VEHICLE

706

THE ECU DETERMINES A COOPERATIVE ADAPTIVE CRUISE CONTROL (CACC)
COMMAND BASED ON THE V2V COMMUNICATION CONTROL MESSAGE AND
THE RELATIVE DISTANCE INFORMATION

708

A SPEED CONTROLLER OF THE ECU TRANSMITS A SPEED CONTROL COMMAND
TO A POWERTRAIN OF THE EGO VEHICLE BASED ON THE CACC COMMAND

710

NO     OCCLUDED?     B

YES

712

THE ECU ESTIMATES A MEMORY-HOLD SPEED OF THE PRECEDING VEHICLE
BASED ON RELATIVE DISTANCE INFORMATION AND RELATIVE VELOCITY
INFORMATION FROM BEFORE THE OCCLUDED STATE

714

THE ECU UPDATES A MINIMUM SPACING VALUE BASED ON A PREVIOUS
SPACING VALUE AND A PREVIOUS RELATIVE VELOCITY VALUE

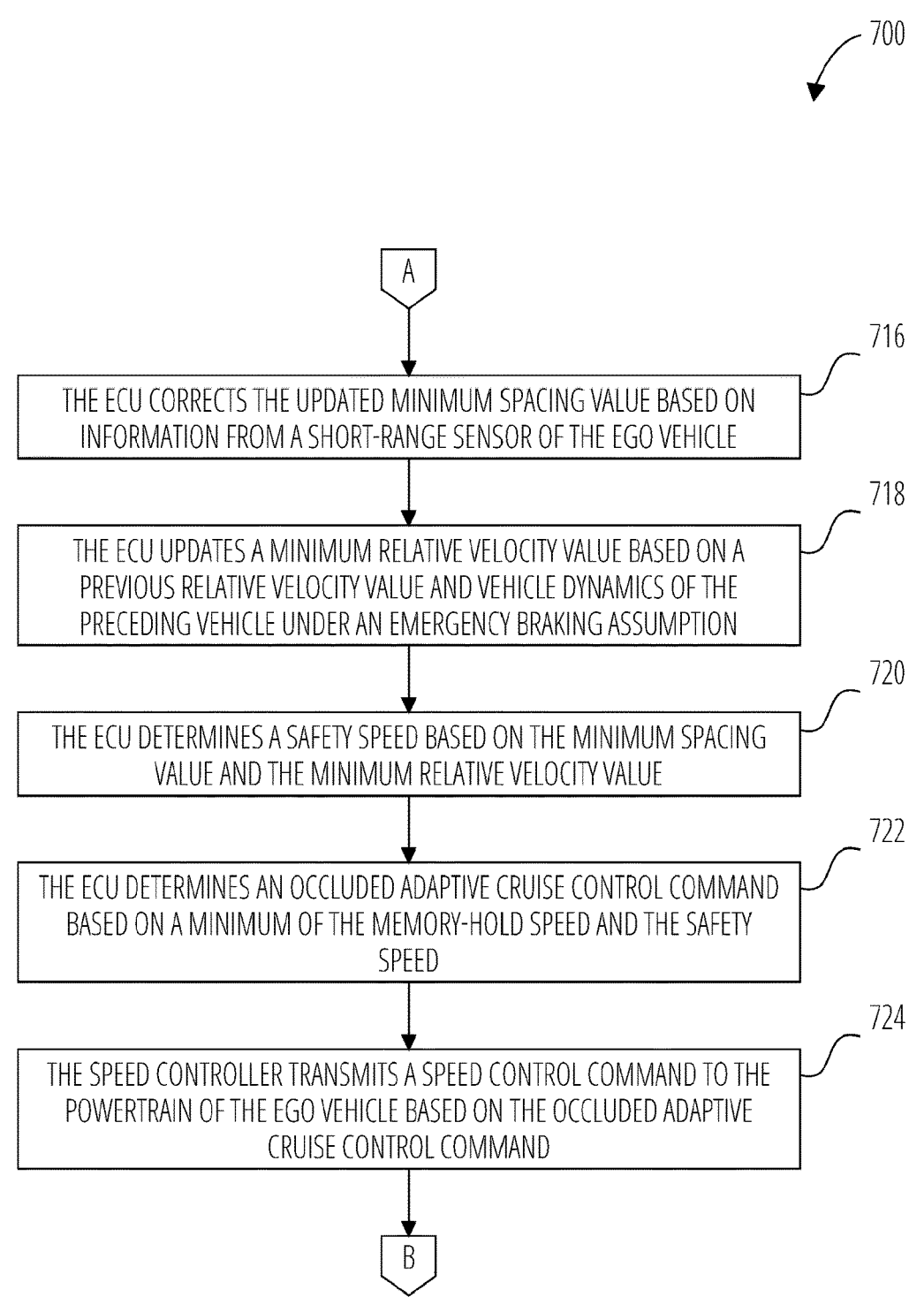

_700_

A

_716_

THE ECU CORRECTS THE UPDATED MINIMUM SPACING VALUE BASED ON INFORMATION FROM A SHORT-RANGE SENSOR OF THE EGO VEHICLE

_718_

THE ECU UPDATES A MINIMUM RELATIVE VELOCITY VALUE BASED ON A PREVIOUS RELATIVE VELOCITY VALUE AND VEHICLE DYNAMICS OF THE PRECEDING VEHICLE UNDER AN EMERGENCY BRAKING ASSUMPTION

_720_

THE ECU DETERMINES A SAFETY SPEED BASED ON THE MINIMUM SPACING VALUE AND THE MINIMUM RELATIVE VELOCITY VALUE

_722_

THE ECU DETERMINES AN OCCLUDED ADAPTIVE CRUISE CONTROL COMMAND BASED ON A MINIMUM OF THE MEMORY-HOLD SPEED AND THE SAFETY SPEED

_724_

THE SPEED CONTROLLER TRANSMITS A SPEED CONTROL COMMAND TO THE POWERTRAIN OF THE EGO VEHICLE BASED ON THE OCCLUDED ADAPTIVE CRUISE CONTROL COMMAND

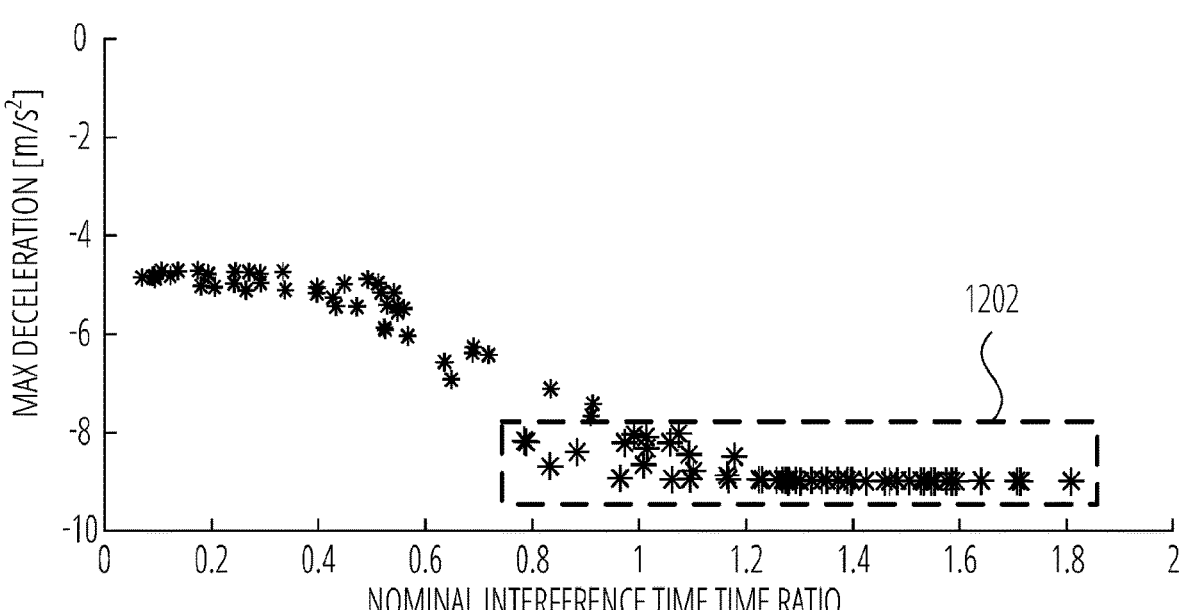
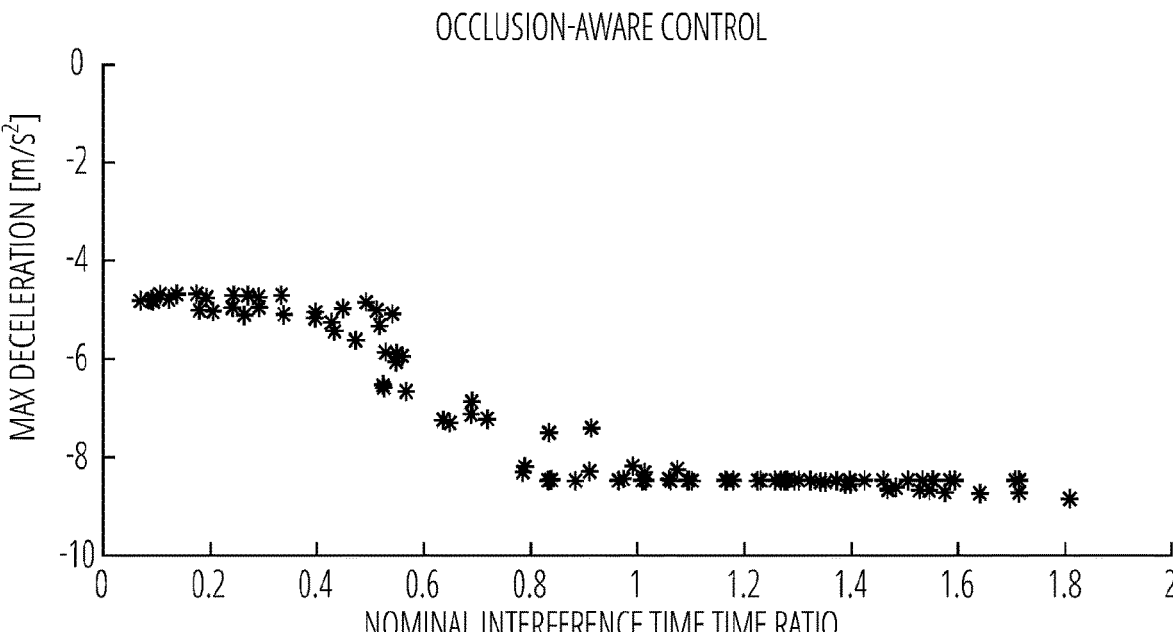
FIG. 12

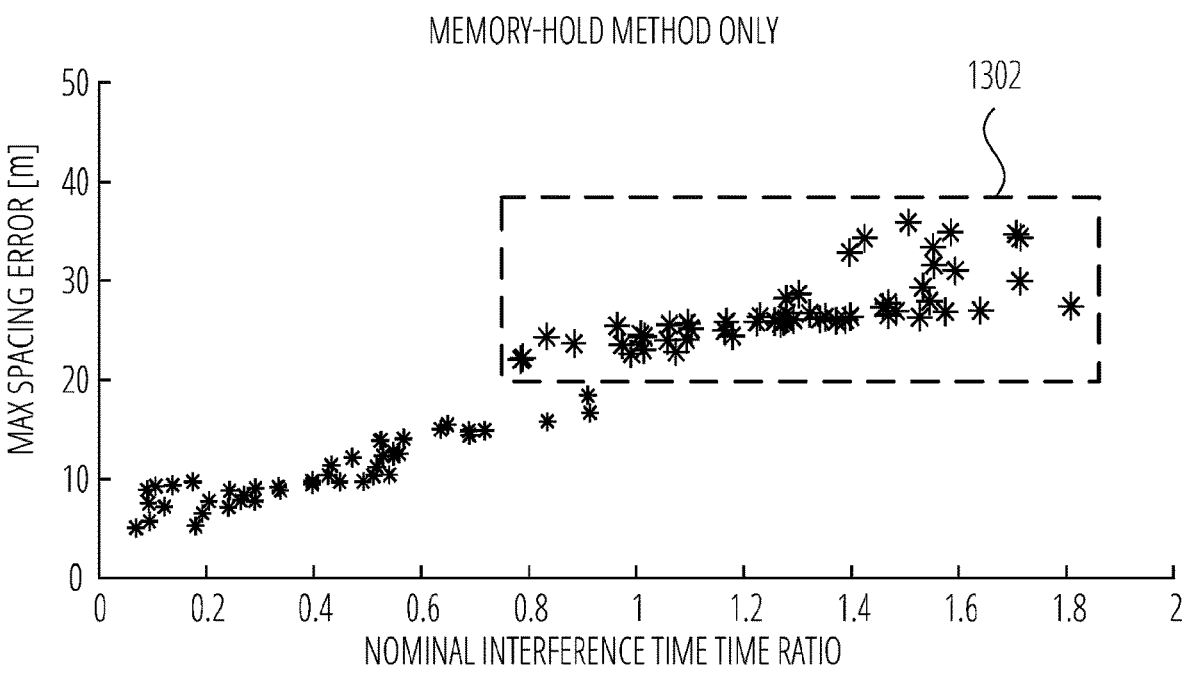
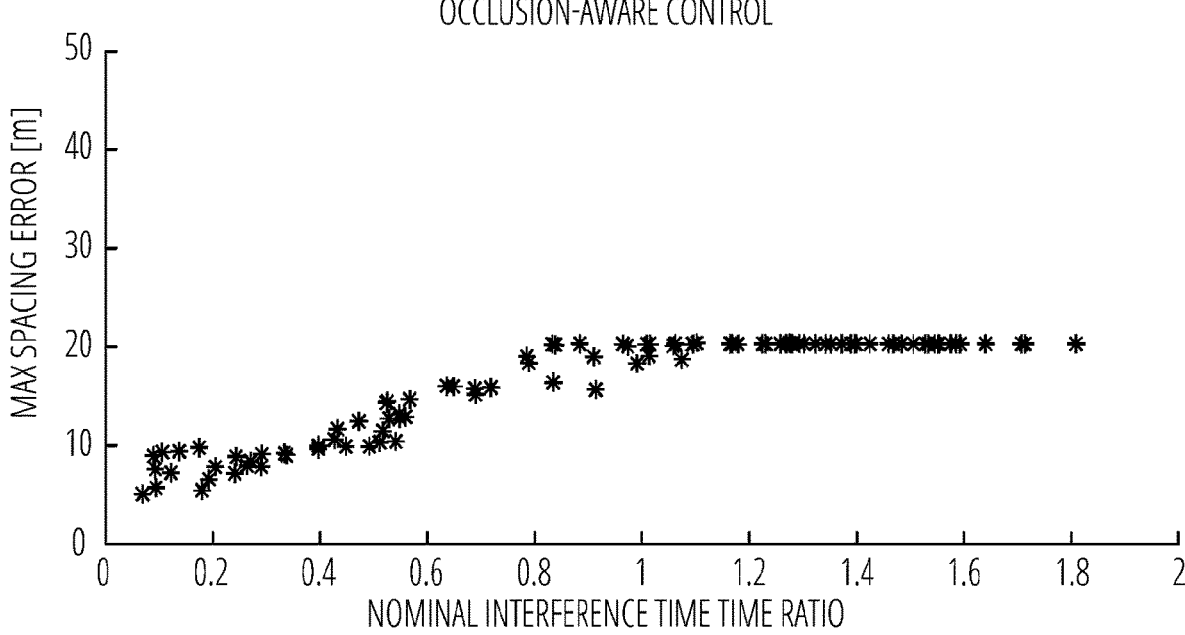
FIG. 13

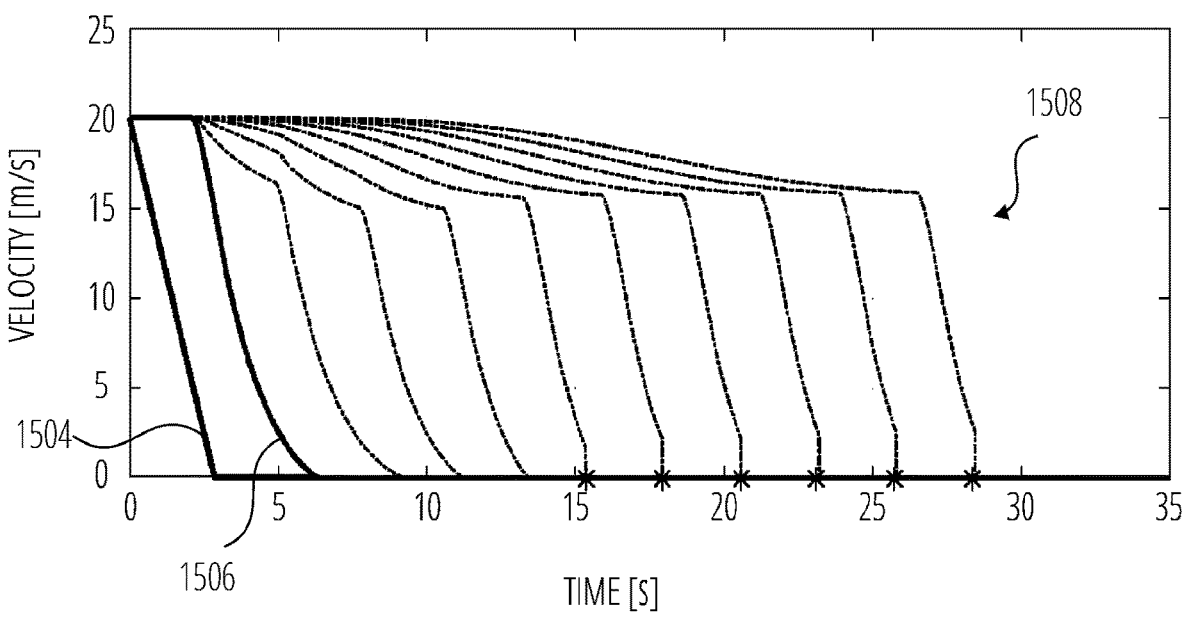
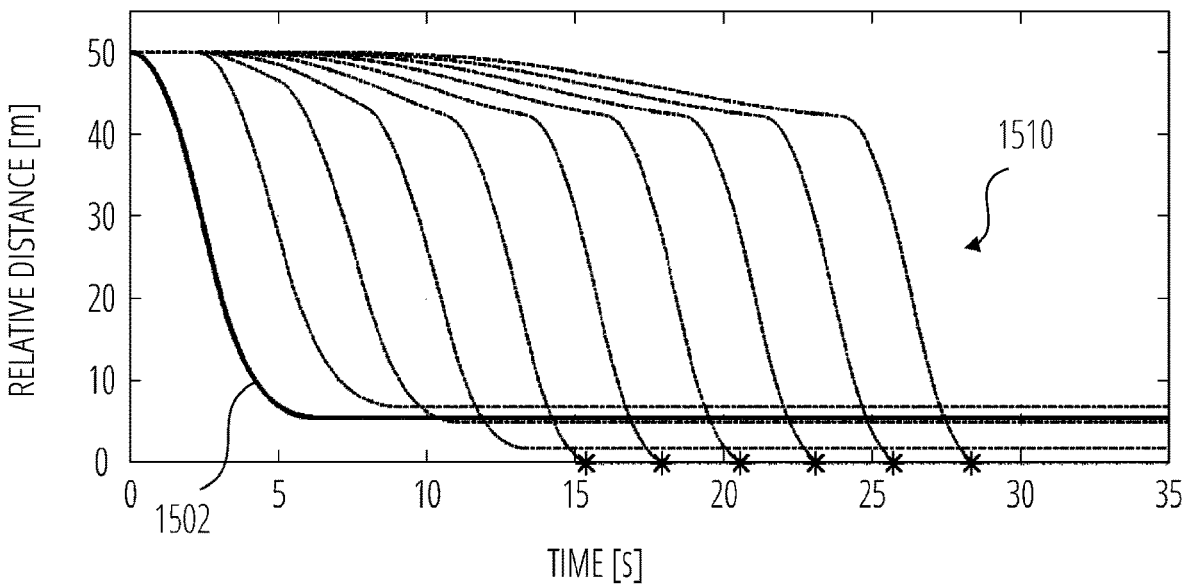
FIG. 15

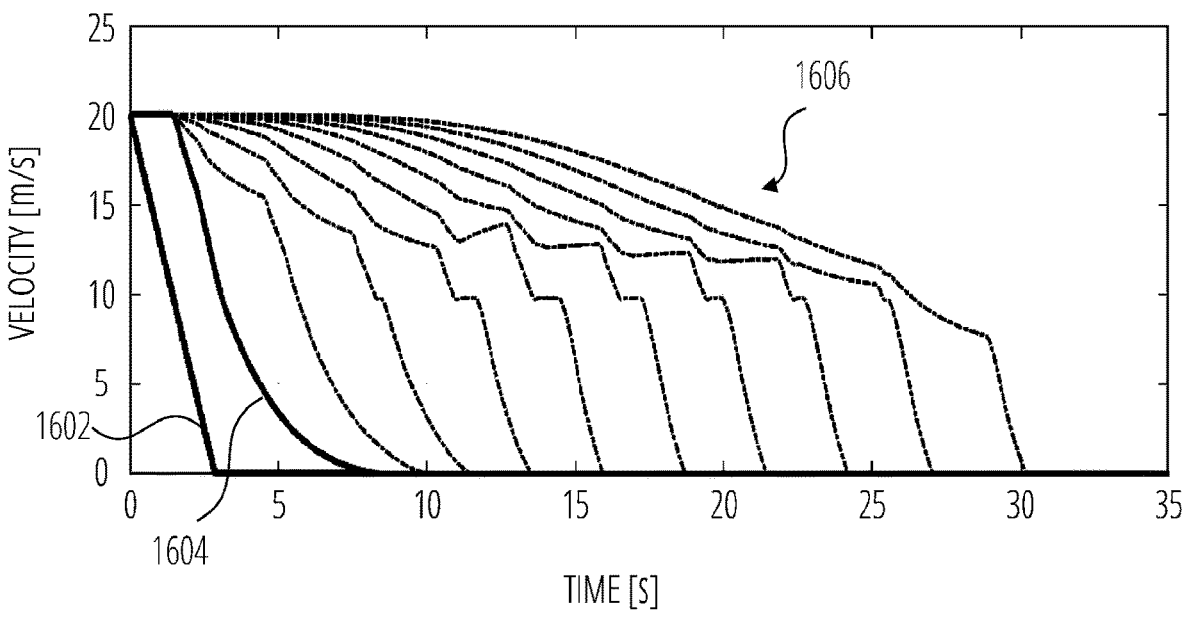
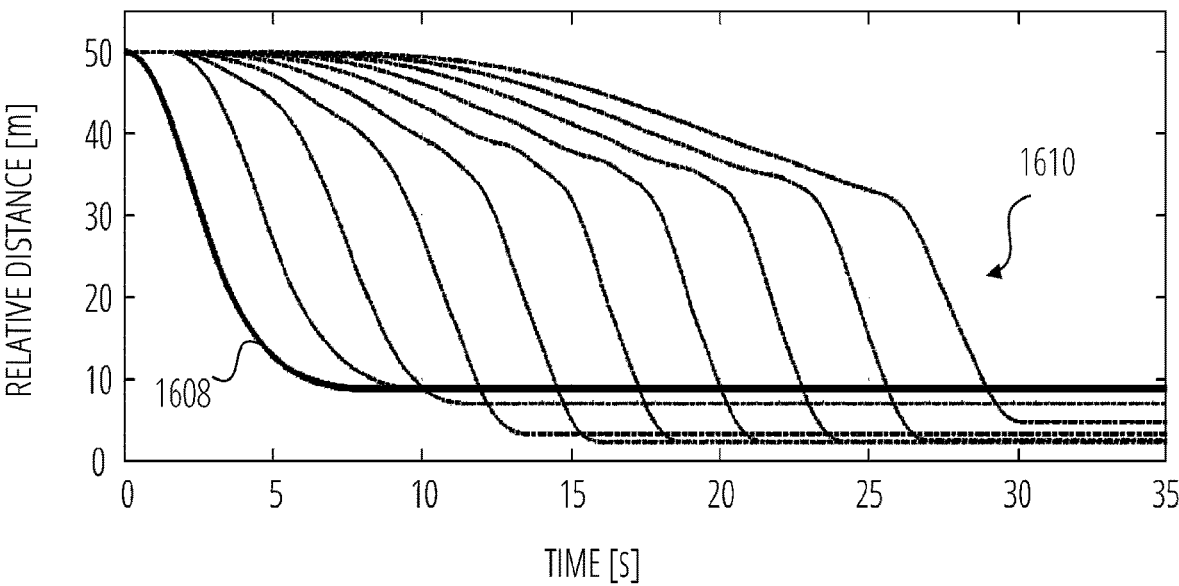
FIG. 16

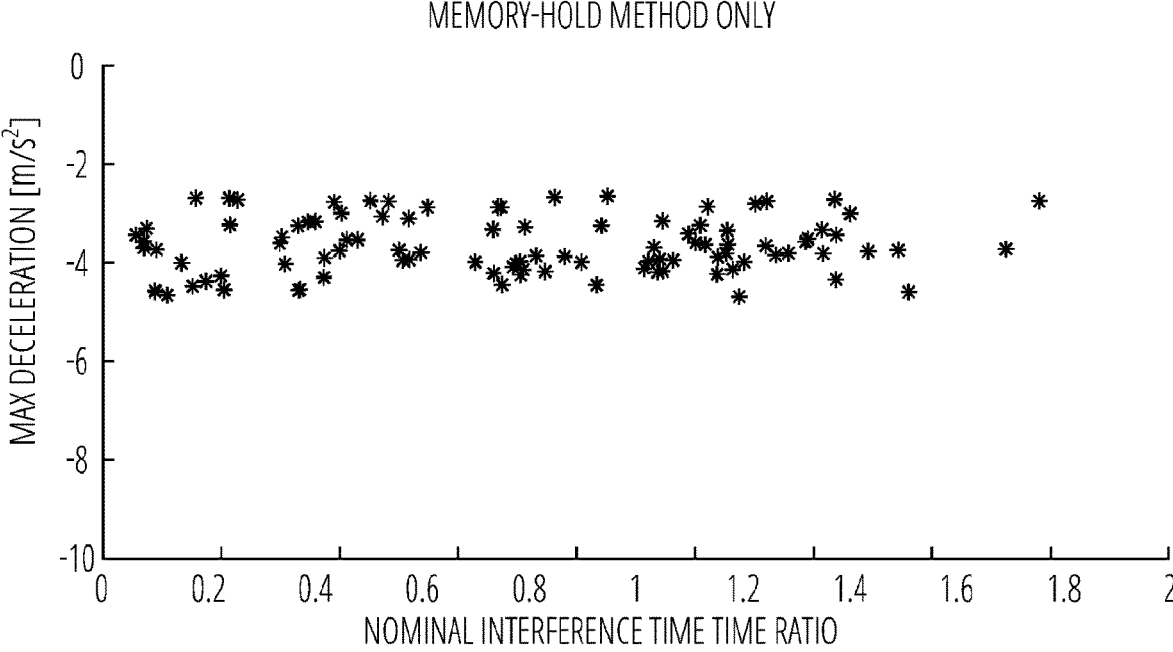
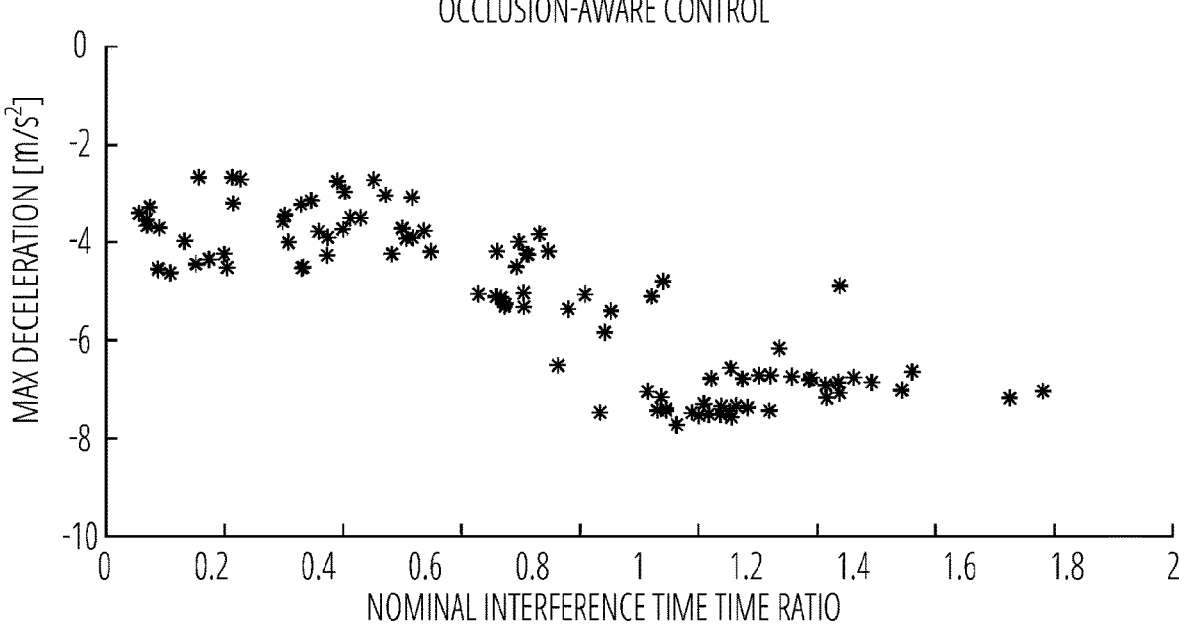
FIG. 17

MEMORY-HOLD METHOD ONLY
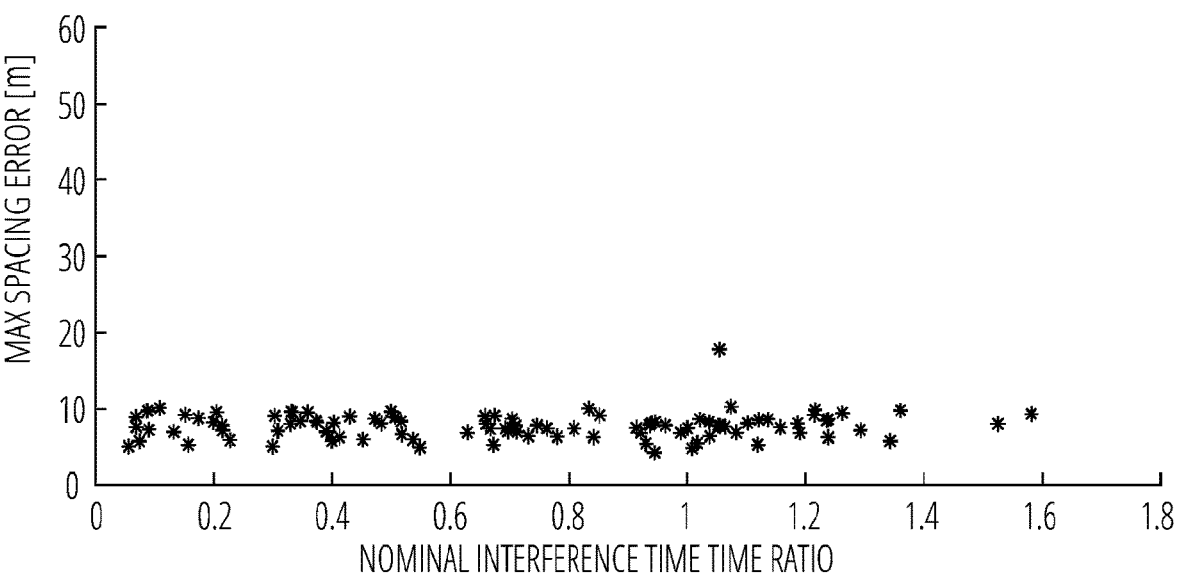
OCCLUSION-AWARE CONTROL
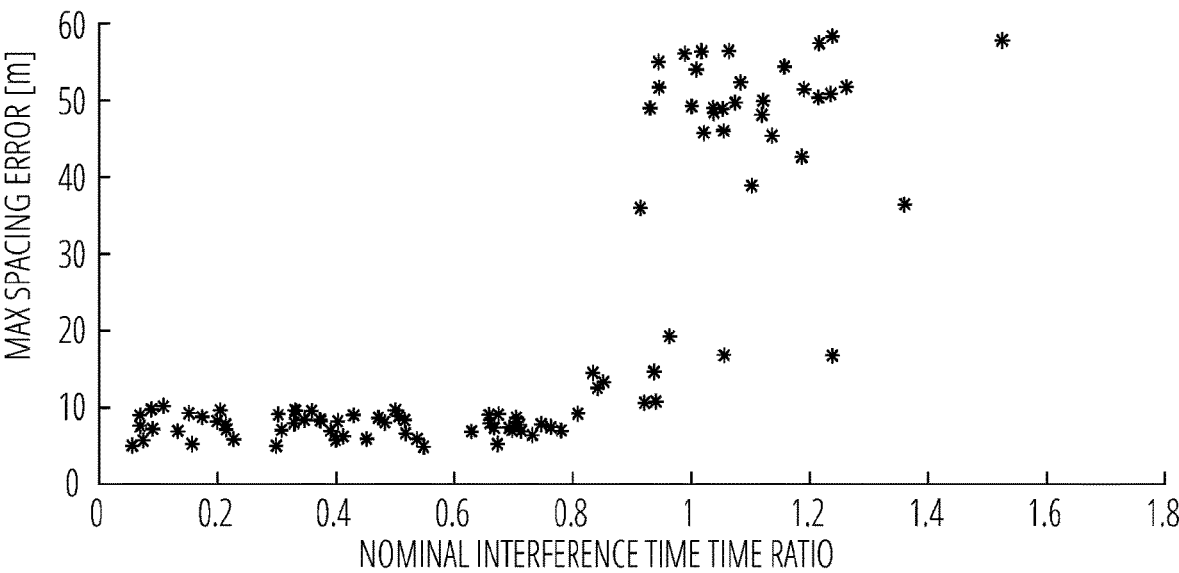
FIG. 18

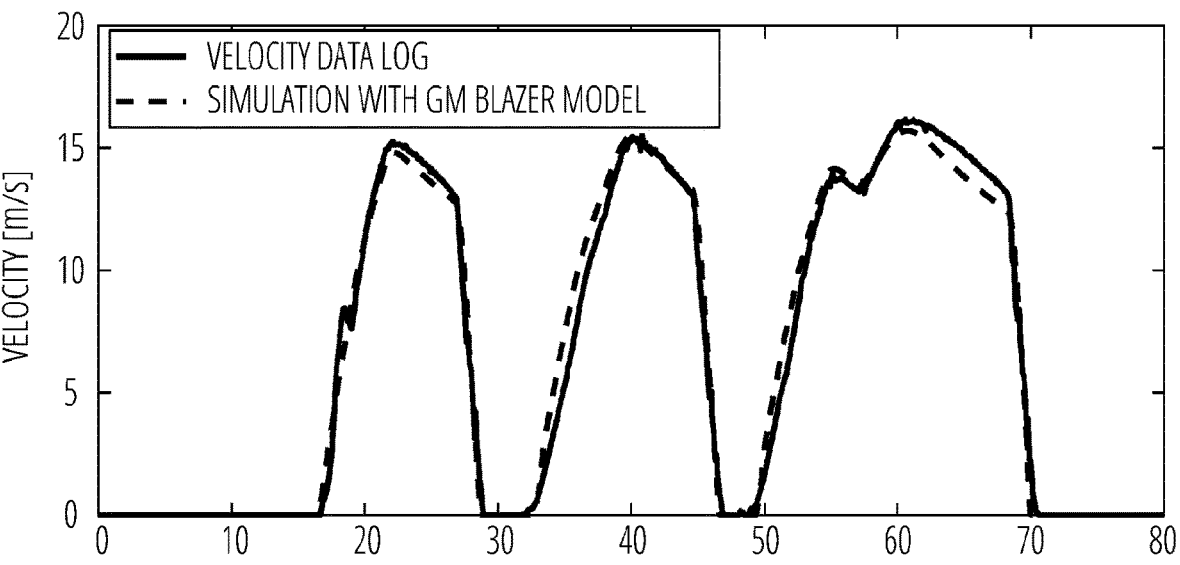
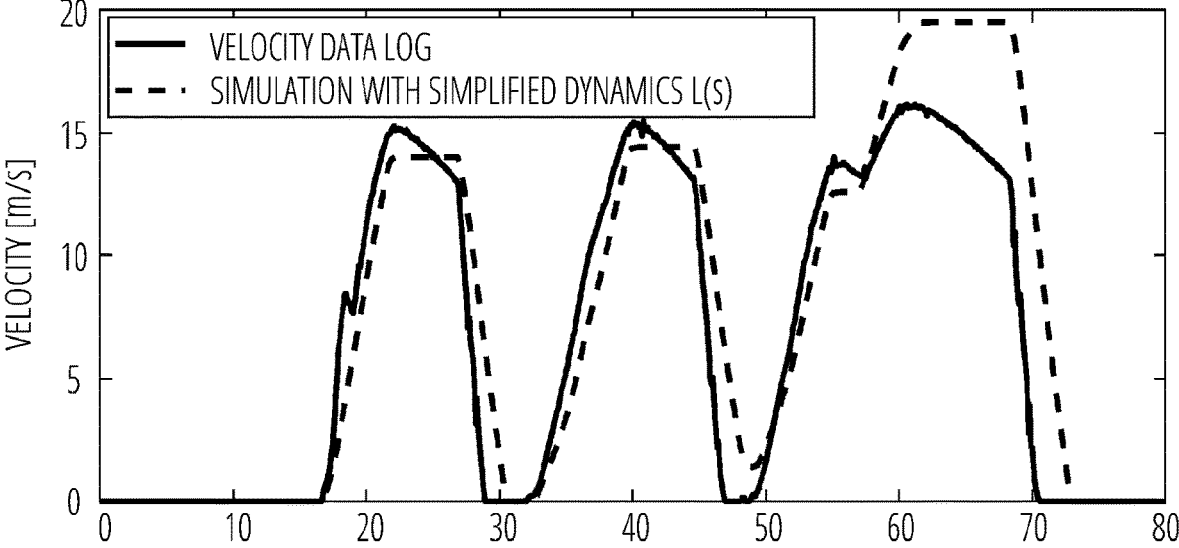
FIG. 19

SAFE OCCLUSION-AWARE COOPERATIVE ADAPTIVE CRUISE CONTROL UNDER ENVIRONMENTAL INTERFERENCE

CROSS-REFERENCE TO RELATED APPLICATION

This application is a National Stage of International Application No. PCT/US2022/043130, filed Sep. 9, 2022 which claims the benefit of Provisional Application No. 63/244,140, filed Sep. 14, 2021, the entire disclosures of which are hereby incorporated by reference herein for all purposes

BACKGROUND

Vehicular platooning for convoys of vehicles can lead to fuel efficiency due to closer inter-vehicle distance than what human drivers can handle, and also improves traffic efficiency. Control of the platoon is achieved using adaptive cruise control (ACC) and cooperative adaptive cruise control (CACC). ACC determines the acceleration command of a vehicle using environmental information obtained by local sensors like radar, camera and lidar. CACC, an extension of ACC, also utilizes the control and dynamics information from other vehicles in the same platoon through vehicle-to-vehicle (V2V) communication techniques. Both ACC and CACC strategies typically utilize the relative spacing and velocity of adjacent vehicles, and compare them with the target spacing determined by the spacing policy to determine an appropriate control action.

Despite the potential benefits brought by vehicular platooning, recent research has shown that the performance of ACC and CACC can deteriorate if the relative spacing measurements are erroneous. The measurements used by platooning are also vulnerable to environmental occlusions and cyber-attacks against the on-board sensing system. Environmental occlusions like extreme lighting conditions and large shadows can cause erroneous estimates from vision-based sensors. Similarly, cyber-attacks against onboard sensors can be induced by local or flying jammers. Previous works have shown that cyber-attacks can falsify the control command or sensor measurements of a specific vehicle within the vehicle platoon, which could cause collisions or destabilize the vehicle string.

Environmental interference, inferred using fault detection and isolation (FDI) techniques, can be managed with the memory-hold method that uses the last-measured state of the preceding vehicle. However, such approaches are only effective for short occlusions and do not guarantee safety for relatively longer occlusions. Similarly, previous works show that lost communication signals could be estimated through filtering techniques, which prevents the platoon from potential collision when the CACC degrades to ACC due to communication loss. However, these techniques still require accurate onboard sensor measurements of the preceding vehicle during interference and are not effective if both sensor and communication fail, e.g., due to jamming. Therefore, while loss of accurate information about the prior vehicle can be inferred, methods to guarantee safety during the occlusion are still lacking in previous techniques. This motivates the current effort to develop platooning methods that guarantee safety under environmental interference.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of controlling speed of an ego vehicle in a vehicle platoon that includes a preceding vehicle and the ego vehicle is provided. Cooperative adaptive cruise control (CACC) commands are provided to a speed controller. The CACC commands are based on at least one of a vehicle-to-vehicle (V2V) communication control received via a wireless communication from the preceding vehicle and a feedback control based on a sensor output of a long-range sensor of the ego vehicle. In response to detecting an occluded state a minimum spacing value and a minimum relative velocity value between the ego vehicle and the preceding vehicle are determined based on information received before the detection of the occluded state; a safety speed based on the minimum spacing value and the minimum relative velocity value is determined; and an occluded adaptive cruise control command is provided to the speed controller to maintain a speed of the ego vehicle that is less than or equal to the safety speed.

In some embodiments, a vehicle is provided that has a speed controller configured to perform such a method. The vehicle comprises a long-range sensor; a vehicle-to-vehicle (V2V) wireless interface; a short-range sensor; and the speed controller, which is communicatively coupled to the long-range sensor, the V2V wireless interface, and the short-range sensor. In some embodiments, a vehicle platoon comprising at least one such vehicle is provided.

In some embodiments, a non-transitory computer-readable medium having computer-executable instructions stored thereon is provided. The instructions, in response to execution by an engine control unit (ECU) of an ego vehicle, cause the ECU to perform actions to control speed of the ego vehicle while in a vehicle platoon that includes a preceding vehicle and the ego vehicle, the actions comprising: providing cooperative adaptive cruise control (CACC) commands to a speed controller, wherein the CACC commands are based on at least one of a vehicle-to-vehicle (V2V) communication control received via a wireless communication from the preceding vehicle and a feedback control based on a sensor output of a long-range sensor of the ego vehicle; and, in response to detecting an occluded state: determining a minimum spacing value and a minimum relative velocity value between the ego vehicle and the preceding vehicle based on information received before the detection of the occluded state; determining a safety speed based on the minimum spacing value and the minimum relative velocity value; and providing an occluded adaptive cruise control command to the speed controller to maintain a speed of the ego vehicle that is less than or equal to the safety speed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7A-FIG. 7B are a flowchart that illustrates a non-limiting example embodiment of a method of occlusion-aware cooperative adaptive cruise control according to various aspects of the present disclosure.

FIG. 8-FIG. 22 are charts that illustrate various aspects of simulations of the memory-hold CACC technique and the occlusion-aware CACC technique according to various aspects of the present disclosure.

DETAILED DESCRIPTION

Figure 1:
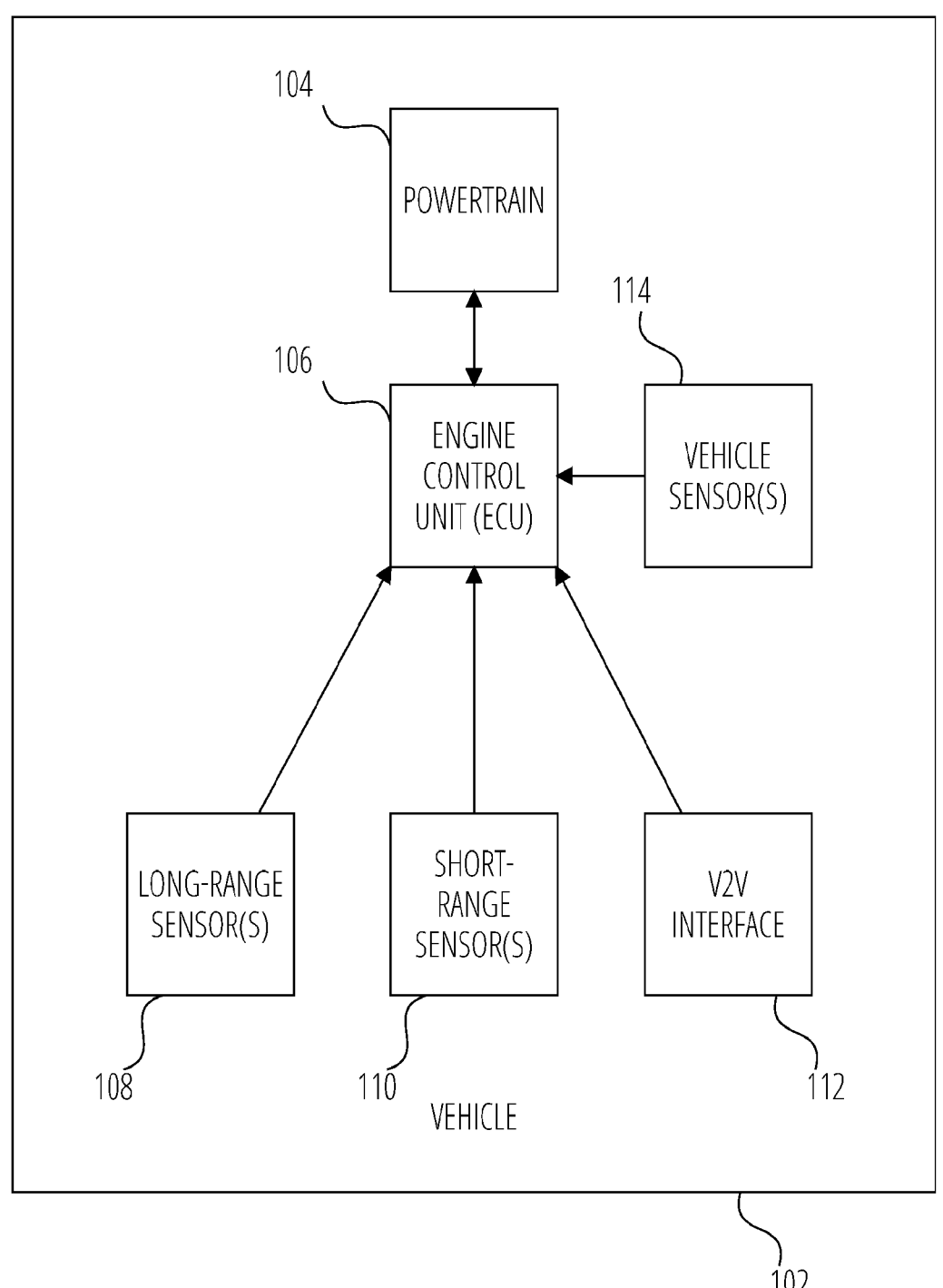
FIG. 1 is a block diagram that illustrates a non-limiting example embodiment of a vehicle according to various aspects of the present disclosure.

Although no positive measurement of the preceding vehicle is available during interference, the negative information, i.e. the absence of preceding vehicle in the sensor measurements, can be used to improve safety. For instance, the target preceding vehicle could be lost due to the failure of the long-range sensor, but if the short-range sensor is still working properly, it can provide the information that the preceding vehicle is further than the perception range of the short-range sensor. In embodiments of the present disclosure, by combining the negative information with the proposed occlusion-aware control technique, collision-free platooning can be maintained by the CACC—even in the emergency scenarios as shown in this work.

The present disclosure provides a new CACC control strategy in which the concept of occlusion-aware control is proposed. Its safety performance is shown to be robust to environmental interference that results in loss of information about the preceding vehicle (such as the relative spacing and command input), regardless of the length and strength of the information occlusion. A safety analysis on the CACC which only uses the memory-hold method for estimation is performed, and is comparatively evaluated against the proposed safe occlusion-aware approach. In particular, the safety threshold for the first two vehicles is derived to show the inability to guarantee safety with the memory-hold method alone. Such potential safety violation can be avoided using the proposed occlusion-aware approach by trading off the performance to guarantee safety.

The memory-hold method is widely adopted and analyzed by CACC research, which investigates the driving situation with jamming attack resulting in information loss about the preceding vehicle. It aims at providing an estimate of the preceding vehicle's state based on the last measurement received before the measurements become unavailable. For example, Liu et al. developed an observer-based controller which holds the memory of all the relative states when the information is not transmitted successfully. However, Amir et al. found that the CACC system could be string unstable that can cause collisions when only using memory-hold methods for providing the missing communication signals under jamming attacks. The inventive approach disclosed herein seeks to augment the memory-hold approach to tradeoff some of the performance to guarantee safety.

Additional advanced estimation techniques have been proposed in previous works to improve the state estimation of the preceding vehicle when the communication signal is lost. For example, the lost information can be estimated from the onboard sensor measurements using Kalman filtering techniques. It relies on some knowledge of the preceding vehicle's dynamics. The performance can be further improved by assuming the acceleration to be the main of the prior values in the motion model, which can be used to adapt to the behaviors of the preceding drivers. However, these estimation improvement techniques rely on valid sensor measurements, and are therefore not applicable when both the communication signals and sensor measurements are lost during interference. In contrast, the approach disclosed herein seeks to maintain safety when both large-range sensing and communication information are not available but bounds are available on the accelerations of the preceding vehicle.

Occlusion-aware control focuses on the impact of the unmeasurable regions on navigation decisions. For example, by considering the risk due to limited sensing in navigation algorithms, the vehicle/robot can navigate through indoor scenarios safely despite some blind spots. Such occlusion-aware control improves the safety in challenging driving scenarios with occluded regions created by other road participants. Occlusion-aware techniques can also provide risk assessment for handling complex driving scenarios like intersections and roundabouts. In computer vision research, similar methods are also used for capturing occluded pedestrians or obstacles from video streams.

In the techniques disclosed herein, we propose the use of occlusion-aware control techniques to restraint the control action of the CACC system to avoid collisions even under extreme emergency braking scenarios. Occlusion-aware techniques usually assume that no information can be measured directly from the occluded region. In order to improve the state estimation of the phantom targets within the occluded region, extra environmental information outside the occluded region can be used including positive (measurable) information such as the behavior of other road participants, or negative (unmeasurable) information such as no target detection within the range of perception. The goal of the control strategy is to navigate through the occluded region safely with these extra information. If the controller can guarantee that the ego vehicle will not have collisions with any phantom obstacles within the occluded region, even with the most aggressive movement, then the vehicle navigation is guaranteed to be collision-free, or "not reachable" by other participants on the road. Moreover, the safety of the vehicle can be guaranteed by establishing speed constraints based on its relative position to the occluded region. The techniques disclosed herein adopt this strategy of establishing speed constraints for each vehicle in the platoon to ensure safety when driving through an occlusion zone where both large-range sensor measurements and wireless communication from the preceding vehicle are unavailable.

FIG. 1 is a block diagram that illustrates a non-limiting example embodiment of a vehicle according to various aspects of the present disclosure. The vehicle 102 may be any type of vehicle configured to operate in a platoon using cooperative adaptive cruise control (CACC) techniques. In some embodiments, the vehicle 102 may be a Class 8 truck. In some embodiments, the vehicle 102 may be another type of vehicle likely to transit long distances in coordination with other vehicles, including but not limited to a bus, a van, a recreational vehicle, a passenger car, or any other type of vehicle. In some embodiments, the vehicle 102 may be configured to operate on a surface other than a roadway, including but not limited to a train car or a hyperloop capsule.

As shown, the vehicle 102 includes a powertrain 104, an engine control unit (ECU 106), one or more vehicle sensors 114, one or more long-range sensors 108, one or more short-range sensors 110, and a V2V interface 112.

The powertrain 104 may include one or more motors, one or more drivetrain components including but not limited to wheels, axles, driveshafts, gear boxes, torque converters, transmissions, batteries, and/or other components for propelling the vehicle 102. The powertrain 104 may also include one or more brakes, flywheels, regenerative braking systems, or other devices for reducing speed of the vehicle 102. In some embodiments, the powertrain 104 may use internal combustion technology, electric propulsion technology, other propulsion technologies, and/or combinations thereof.

The one or more vehicle sensors 114 may include any type of sensor that provides information to the ECU 106 regarding a state of the vehicle 102. For example, the vehicle sensors 114 may include one or more of a vehicle speed sensor, a positioning sensor (such as a global positioning system (GPS) sensor), an engine speed sensor, a fuel tank sensor, a gearbox status sensor, and/or any other type of vehicle sensor.

The one or more long-range sensors 108 are configured to determine measurements of relative distances between a given vehicle and a preceding vehicle. In some embodiments, the long-range sensors 108 may include one or more of a two-dimensional camera, a three-dimensional camera, a radar, a lidar, or any other suitable type of sensing technology (or combinations thereof).

In some embodiments, the one or more short-range sensors 110 may also be configured to determine measurements of relative distances between a given vehicle and a preceding vehicle, but over a shorter distance than the long-range sensors 108. In some embodiments, the short-range sensors 110 may include one or more of a two-dimensional camera, a three-dimensional camera, a radar, a lidar, an ultrasonic sensor, or any other suitable type of sensing technology (or combinations thereof).

In some embodiments, a similar type of sensor may be used as a long-range sensor 108 and a short-range sensor 110, but with a different configuration. For example, a radar sensor may be configured as a long-range sensor 108 by using a narrow opening angle (thus providing information from a narrow area but a long distance), or as a short-range sensor 110 by using a wide opening angle (thus providing information from a wide area but a short distance). Typically, a short-range sensor 110 is a sensor configured to have a maximum sensing distance in a range of 27-33 meters, such as 30 meters, whereas a long-range sensor 108 is a sensor configured to have a maximum sensing distance in a range of 110-130 meters, such as 120 meters, or greater.

In some embodiments, the V2V interface 112 is a wireless communication interface by which the vehicle 102 may communicate with other vehicles in a platoon. Typically, in a CACC system, the vehicle 102 will use the V2V interface 112 to receive control commands being implemented by one or more other vehicles in the platoon (e.g., a preceding vehicle), and use the V2V interface 112 to transmit control commands being implemented by the vehicle 102.

The ECU 106 is configured to receive signals from the long-range sensors 108, the short-range sensors 110, and the V2V interface 112, along with signals from one or more vehicle sensors 114, in order to determine control commands for the powertrain 104. For example, the ECU 106 may determine a desired absolute or relative speed for the vehicle 102, and may transmit commands to one or more components of the powertrain 104 in order to cause the vehicle 102 to operate as desired by the control strategy.

In some embodiments, the ECU 106 includes a memory, one or more communication interfaces to communicate with the other components of the vehicle 102, and a processor for executing instructions stored in the memory, processing information received from the other components of the vehicle 102, and transmitting instructions to the other components of the vehicle 102. In some embodiments, the memory may be a firmware or other reprogrammable computer-readable medium. In some embodiments, the processor and instructions may be provided together by an ASIC, an FPGA, or another computing device in which the instructions are provided in hardware.

In some embodiments, functionality of the ECU 106 may be compartmentalized into separate components. For example, the CACC functionality may be provided by a CACC controller of the ECU 106, and instructions for operating the powertrain 104 to implement commands determined by the CACC controller may be generated by a speed controller of the ECU 106. In some embodiments, multiple physical ECUs may be provided which collaboratively provide the functionality described herein.

Figure 2:
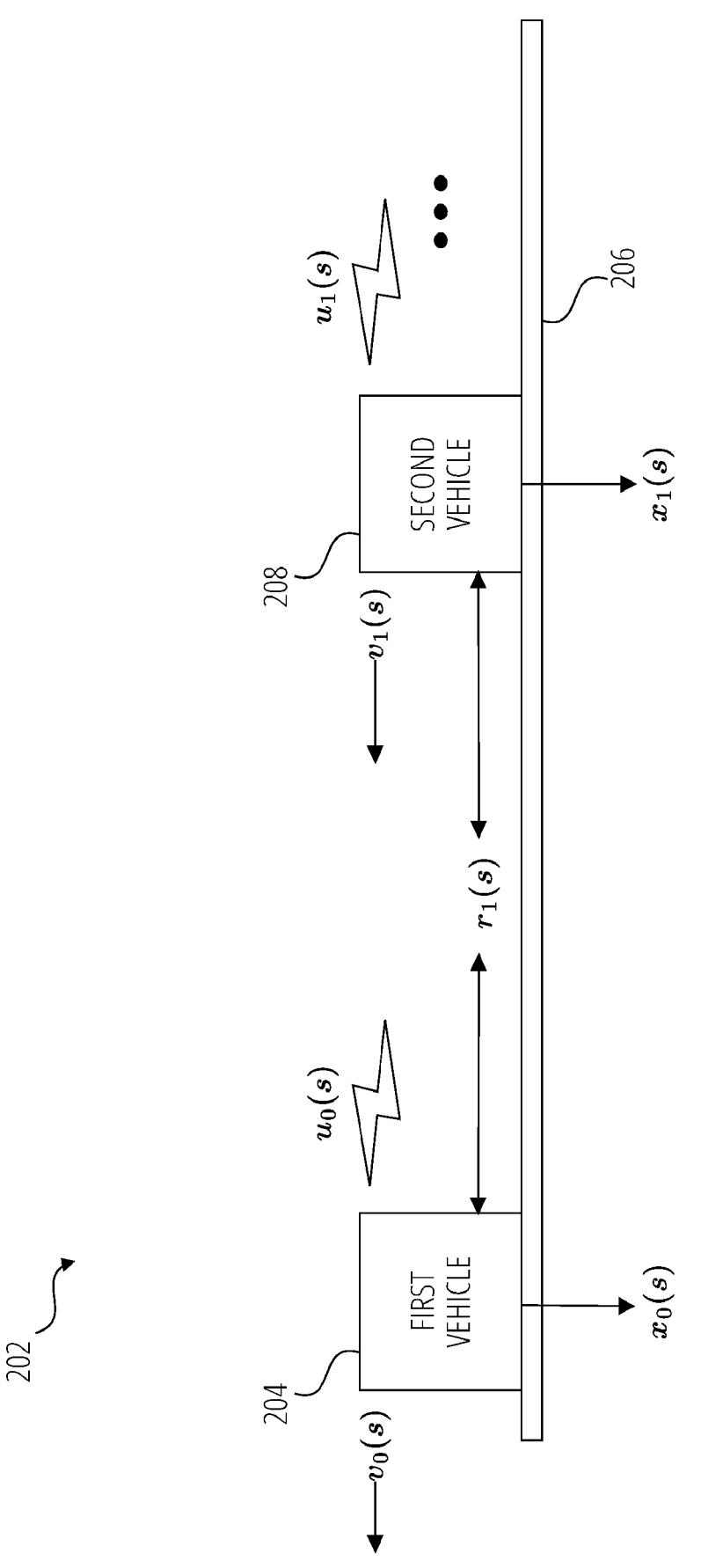
FIG. 2 is a schematic diagram that illustrates a vehicle platoon according to various aspects of the present disclosure.

The vehicle 102 illustrated in FIG. 1 is an example of a type of vehicle configured to operate in a platoon using CACC techniques. FIG. 2 is a schematic diagram that illustrates a vehicle platoon according to various aspects of the present disclosure. The platoon 202 is illustrated as operating on a roadway 206 and traveling from right to left. A first vehicle 204 is the lead vehicle of the platoon 202, and a second vehicle 208 is a follower vehicle. With respect to the second vehicle 208, the first vehicle 204 is the preceding vehicle. Though only a first vehicle 204 and a second vehicle 208 are illustrated, in some embodiments, the platoon 202 may include a number N of vehicles greater than two. In such embodiments, for a vehicle at position i, the vehicle at position i−1 is its preceding vehicle (wherein the first vehicle 204 is at position i=0).

In the present disclosure, the vehicles of the platoon 202 except for the first vehicle 204 are assumed to be homogenous (i.e., all of the vehicles in the platoon 202 are assumed to share the same vehicle dynamics L(s), feedback controller F(s), and vehicle-to-vehicle (V2V) communication control C(s). The CACC law of the $i^{th}$ vehicle $u_i(s)$ is given as:

$$u_i(s) = C(s)u_{i-1}(s) + F(s)\delta_i(s)$$

where $\delta_i(s)$ is the tracking error of the $i^{th}$ vehicle. Using constant time headway (CTH) policy with the headway time $\lambda > 0$ and clearance $d_0$, the tracking error is $$\delta_i(s) = r_i(s) - \lambda v_i(s) - \frac{d_0}{s}$$

$$r_i(s) = x_{i-1}(s) - x_i(s)$$

where $r_i(s)$ represents the relative distance between the $(i-1)^{th}$ and $i^{th}$ vehicle. The position and the velocity of the $i^{th}$ vehicle are represented by $x_i(s)$ and $v_i(s)$ and can be found from the vehicle dynamics L(s) as $$x_i(s) = L(s)u_i(s).$$

For the $i^{th}$ vehicle, the true values of both the relative spacing $r_i$ and wireless communication $u_{i-1}$ are unknown in the interference zone. However, it is assumed that the shorter-range sensing with known range $R_i$ is still available—otherwise the only recourse is to stop the vehicle. The available range of perception $R_i$ (which reflects the strength of the environmental interference) is considered to be smaller than the actual relative spacing $r_i$ of the platoon 202. Moreover, in the following, the loss of detection is modeled to occur when the vehicle drives into a certain zone of the drive cycle, i.e. its position $x_i$ is in the set $x_i(t) \in [x_s, x_e]$, where $x_s$, $x_e$ indicates the start and the end location of environmental interference. This detection-loss model can be applied to various driving scenarios, e.g., when the platoon 202 cruises through a curve with line-of-sight occlusion when operating without wireless communication, or when the vehicle's communication system is under attack by fixed jamming on a section of the road.

The CACC control law described above relies on the detection of the relative position $r_i$ and the V2V communication command $u_{i-1}$ of the preceding vehicle for producing the control command $u_{i-1}$. However, during interference, both measurements ($r_i$ and $u_{i-1}$) are unavailable. The memory-hold technique may then be applied to fill in the gap of information. In this case, the last known values of the relative spacing $r_{i,0}$ and the wireless communication of the preceding vehicle's command input $u_{i-1,0}$ are preserved by the system. As the vehicle drives through the interference zone $x_i(t) \in [x_s, x_e]$, the value of the relative spacing $r_i(t)$ and command input $u_{i-1}(t)$ are based on the last known values, i.e., $$r_i(t) = r_{i,0}$$

$$u_{i-1}(t) = u_{i-1,0}$$

Figure 3:
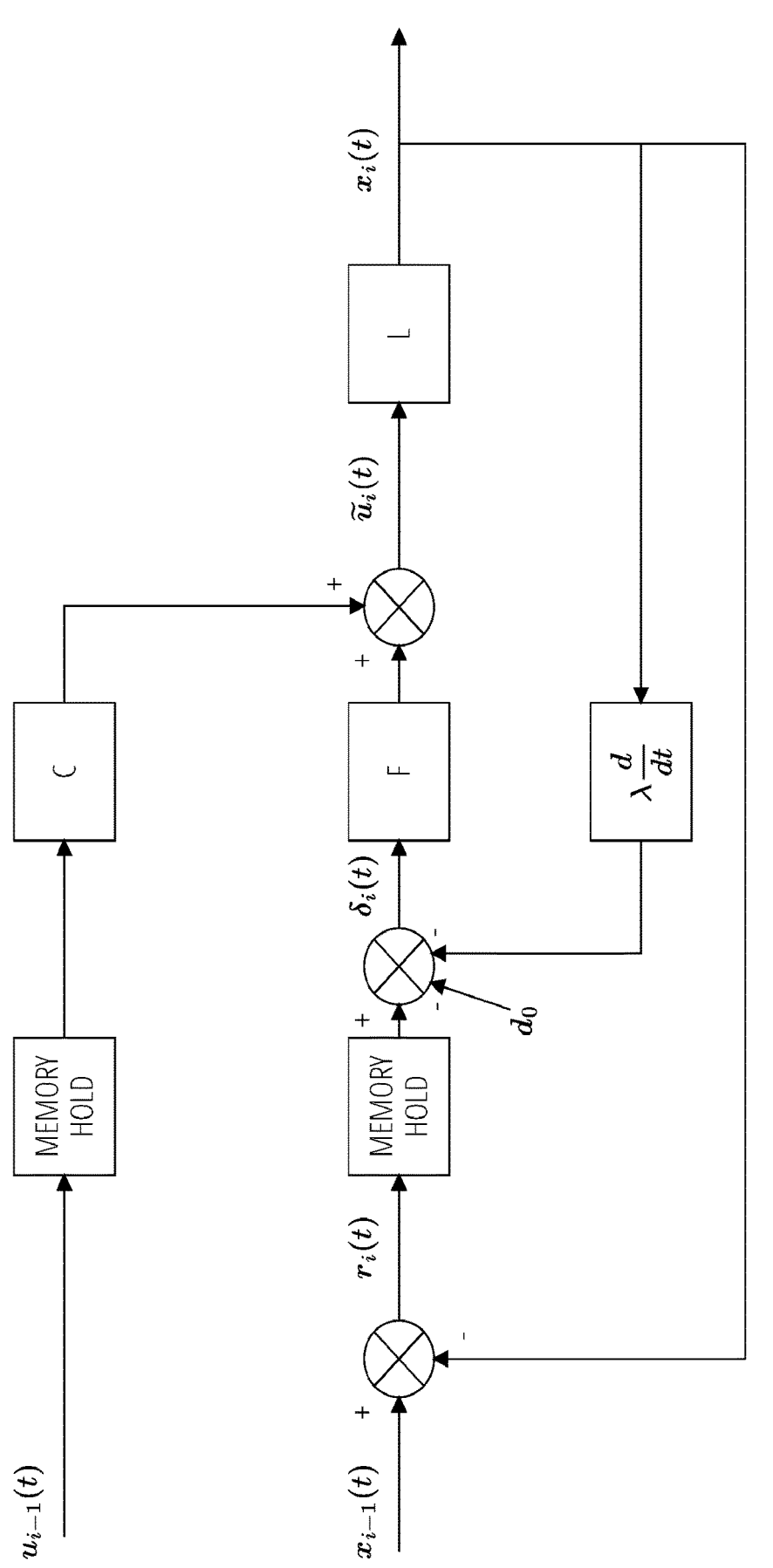
FIG. 3 is a block diagram that illustrates a memory-hold CACC technique according to various aspects of the present disclosure.

The resulting modified CACC input $\tilde{u}_i(s)$ in the interference zone, with the memory-hold method, is given by $$\tilde{u}_i(s) = C(s)\frac{u_{i-1,0}}{s} - F(s)\left(\frac{r_{i,0}}{s} - \lambda v_i(s) - \frac{d_0}{s}\right)$$

and can be represented by the block diagram in FIG. 3. One will recognize that the logic of the block diagram in FIG. 3 may be implemented by the ECU 106 in order to instantiate the CACC strategy.

Safety of the platoon 202 cannot be guaranteed with memory-hold methods if the environmental interference interval is long. Accordingly, a safety time threshold may be derived beyond which safety cannot be guaranteed.

The vehicle dynamics L(s) listed above may be described by a standard model of the form $$L(s) = \frac{1}{(\tau s + 1)s^2}$$

and the CACC feedback controller F(s) and the feedforward controller C(s) are given as $$F(s) = C_p + C_u s$$

$$C(s) = 1.$$

Then, the control command $\tilde{u}_i(s)$ can be rewritten as $$\tilde{u}_i(s) = \frac{u_{i-1,0}}{s} + (C_p + C_u s)\left(\frac{r_{i,0}}{s} - \lambda v_i(s) - \frac{d_0}{s}\right)$$

$$= \frac{C_p}{s}(r_{i,0} - d_0) - C_p \lambda v_i(s) - C_u \lambda(s v_i(s) - v_{i,0}) + \frac{u_{i-1,0}}{s}$$

Given the initial velocity $v_{i,0}$ and acceleration $a_{i,0}$, the control command $\tilde{u}$ can be found from the equations above as $$\tilde{u}_i(s) = \tau(s^2 v_i(s) - s v_{i,0} - \alpha_{i,0}) + (s v_i(s) - v_{i,0}).$$

Combining the previous two equations, the vehicle's velocity $v_i(t)$ can be found to be:

$$v_i(s) = \frac{\tau v_{i,0} s^2 + (C_u \lambda v_{i,0} + \tau a_{i,0} + v_{i,0})s + C_p(r_{i,0} - d_0) + u_{i-1,0}}{s(\tau s^2 + (1 + C_u \lambda)s + C_p \lambda)}.$$

To ensure closed loop stability, the eigenvalues $p_{1,2}$ of the characteristic polynomial $$P(s) = \frac{1}{\tau}(\tau s^2 + (1 - C_u \lambda)s + C_p \lambda)$$

are designed to be distinct negative real numbers, given by:

$$p_{1,2} = \frac{-(1 + C_u \lambda) \pm \sqrt{(1 + C_u \lambda)^2 - 4\tau C_p \lambda}}{2\tau}.$$

For ease in notation, the coefficients of the numerator of the transfer function defining $v_1(s)$ are denoted as:

$$k_i^{(0)} = C_p(r_{i,0} - d_0) + u_{i-1,0}$$

$$k_i^{(1)} = C_u \lambda v_{i,0} + \tau a_{i,0} + v_{i,0}$$

$$k_i^{(2)} = \tau v_{i,0}$$

where $k_i^{(n)}$ indicates the $n^{th}$ order coefficient of the numerator of the $i^{th}$ vehicle. Then the transfer function can be factorized as:

$$v_i(s) = \frac{k_i^{(2)} s^2 - k_i^{(1)} s + k_i^{(0)}}{s\tau(s - p_1)(s - p_2)}$$

$$= \frac{1}{\tau}\left(\frac{c_i^{(0)}}{s} + \frac{c_i^{(1)}}{s - p_1} + \frac{c_i^{(2)}}{s - p_2}\right)$$

where $$c_i^{(0)} = \frac{k_i^{(0)}}{p_1 p_2}$$

$$c_i^{(1)} = \frac{p_1^2 k_i^{(2)} + p_1 k_i^{(1)} + k_i^{(0)}}{p_1(p_1 - p_2)}$$

-continued $$c_i^{(2)} = \frac{p_2^2 k_i^{(2)} + p_2 k_i^{(1)} + k_i^{(0)}}{p_2(p_2 - p_1)}$$

and where the coefficients $$c_i^{(0)}, c_i^{(1)}, c_i^{(2)}$$

only depend on the feedback controller design and the initial conditions of the $i^{th}$ vehicle. It follows from the above that the velocity of the $i^{th}$ vehicle is $v_i(t)$ is given by:

$$v_i(t) = \frac{1}{\tau}\left(c_i^{(0)} + c_i^{(1)} e^{p_1 t} + c_i^{(2)} e^{p_2 t}\right).$$

The safety time threshold for the first two vehicles in the platoon 202 may then be derived as follows. The actual relative spacing $r_1(t)$ evolves with time as:

$$r_1(t) = r_{1,0} + \int_0^t \left(v_0(\hat{t}) - v_1(\hat{t})\right) d\hat{t}.$$

The platooning cannot guarantee collision-free operation between the first two vehicles once their relative spacing is shorter than the braking distance of the follower vehicle. Therefore, the safety constraint is given by ensuring that the braking distance $d_s(v_1)$ of the first follower vehicle is smaller than the relative distance $r_1$ to its preceding vehicle at all times, i.e. safety cannot be guaranteed if $$f_1(t) = r_1(t) - d_s(v_1(t)) \le 0$$

The braking distance $d_s$ of the vehicle depends on various factors such as the mass of the vehicle, braking efficiency, and rolling resistance. Thus, the safety time threshold T to guarantee safety between the first two vehicles (i=0, i=1) in the platoon 202 is given as $$T_1 = \min_t \{f_1(t) \le 0\}.$$

The worst case (smallest threshold T) occurs when the lead vehicle conducts an emergency brake with its maximum deceleration $a_0 = a_d$ as soon as the interference happens. The $v_0(t)$ is then given by $$v_0(t) = \max\{v_{0,0} - a_d t, 0\},$$

and the function $f_1(t)$ then becomes $$f_1(t) = r_{1,0} + \int_0^t \left[v_0(\hat{t}) - v_1(\hat{t})\right] d\hat{t} - d_s(v_1(t)).$$

The representation of $v_1(t)$ provided above incudes a constant term and two exponential terms which decay in time. In addition, $v_0(t)$ decays to 0 by time $t = v_{0,0}/a_d$. Therefore, the function $f_1(t)$ is dominated by the integral of the constant term $$c_1^{(0)}.$$

If $$c_1^{(0)} > 0,$$

the function $f_1(t)$ decays when time t becomes large. Therefore, a safety time threshold T, beyond which safety cannot be guaranteed, exists if $$c_1^{(0)} > 0$$

or, equivalently, the initial conditions are such that $$k_i^{(0)} = C_p(r_{i,0} - d_0) + u_{i-1,0} > 0$$

where $C_p > 0$ to ensure closed-loop stability of the second order characteristic polynomial above.

A simulated example may be used to evaluate the safety time threshold described above. The lead vehicle and the first follower vehicle are assumed to be cruising at $v_{0,0} = v_{1,0} = 20$ m/s (about 45 mph) at the start of the interference. Next, the lead vehicle conducts an emergency brake with deceleration magnitude $a_d = 9$ m/s$^2$ during interference, where the value of $a_d$ is chosen according to the average braking performance of typical vehicles. The resulting velocity of the lead vehicle is $v_0(t) = 20 - 9t$.

The desired spacing policy $\lambda = 2$ s is selected according to the recommended headway time for safe platooning. In this example, the initial conditions and other parameters are given as:

| Parameter | Value |
|---|---|
| $d_0$ | 10 m |
| $r_{1,0}$ | 50 m |
| $\tau$ | 0.2 |
| $u_{0,0}$ | 0 m/s$^2$ |
| $C_p$ | 4 |
| $C_u$ | 28 |

In this example, the actual braking distance is solved numerically from the vehicle dynamics in the equation above as a solution to a transcendental equation. For simplicity, it can be estimated by a quadratic function of velocity such as $$d_s(v) = \frac{v^2}{2a_d} v\Delta T,$$

where $a_d$ is the maximum deceleration of the vehicle, and $\Delta T$ is an approximation of the time for the vehicle system to react.

Figure 4:
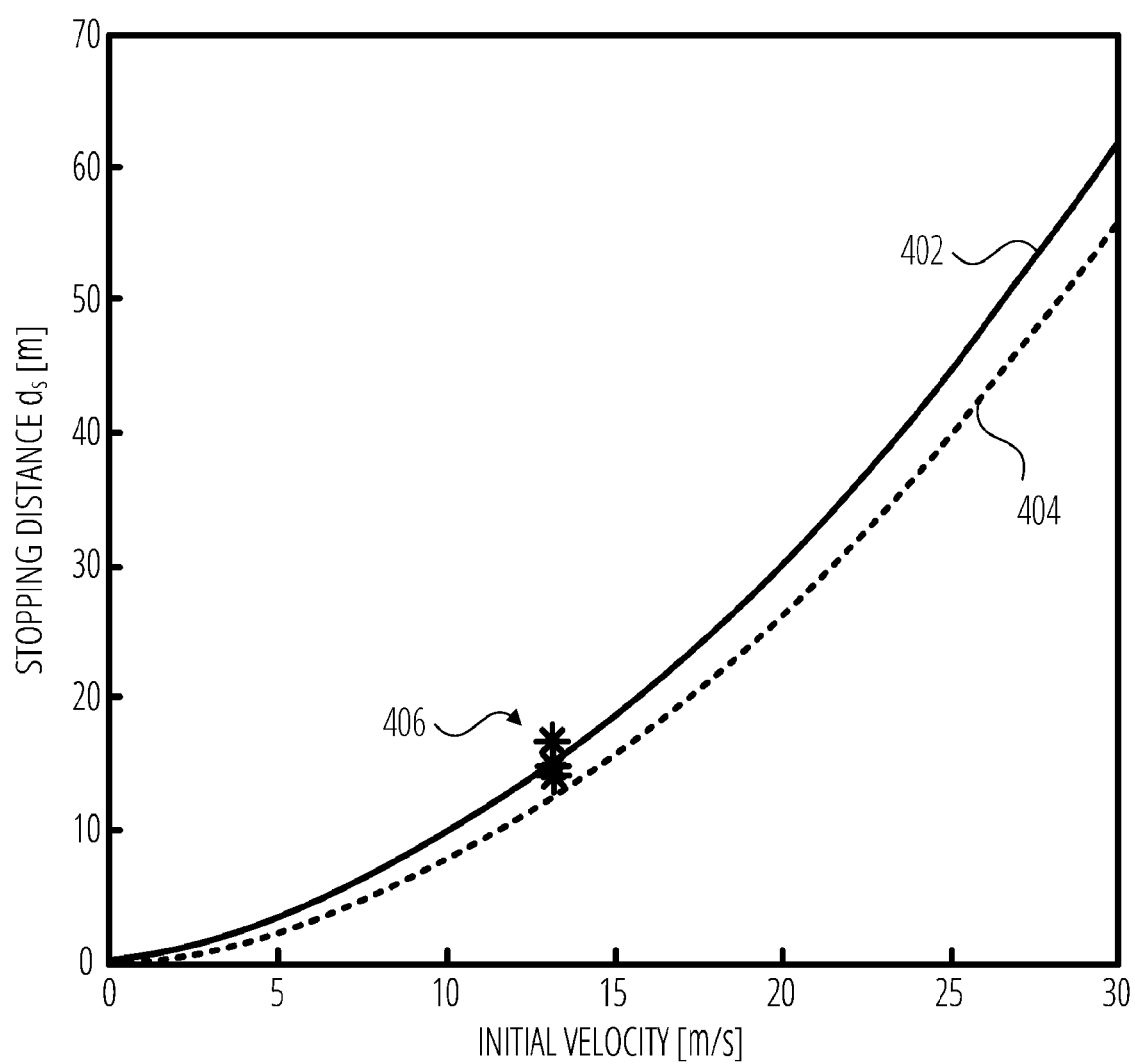
FIG. 4 is a chart that illustrates differences between an approximation of the vehicle dynamics and precise values computed numerically from the vehicle dynamics equation according to various aspects of the present disclosure.

FIG. 4 illustrates the difference between this approximation and values computed numerically from the vehicle dynamics equation. In FIG. 4, the numerical solution 402 and the approximated result 404 are shown, along with stars representing GM Blazer experimental data at 30 mph 406.

These experimental results also match experimental data collected from emergency braking tests on a GM Blazer at 30 mph. Assuming that the reaction time is twice the time constant $\tau$ of the vehicle dynamics L, i.e., $\Delta T = 2\tau = 0.4$ s, using the parameter values in the table above and the braking distance approximation into the function for $f_1(t)$, and the safety-check function $f_1(t)$ is computed as $$f_1(t) = \begin{cases} -\frac{1}{2}9t^2 + 19.78, & t \le 2.22 \\ -20t + 42, & t > 2.22 \end{cases}$$

By solving $f_1(t)=0$ in this equation, the safety time threshold $T_1$ can then be computed as $$T_1 = \sqrt{19.78\left(\frac{2}{9}\right)} \approx 2.1s.$$

Figure 5:
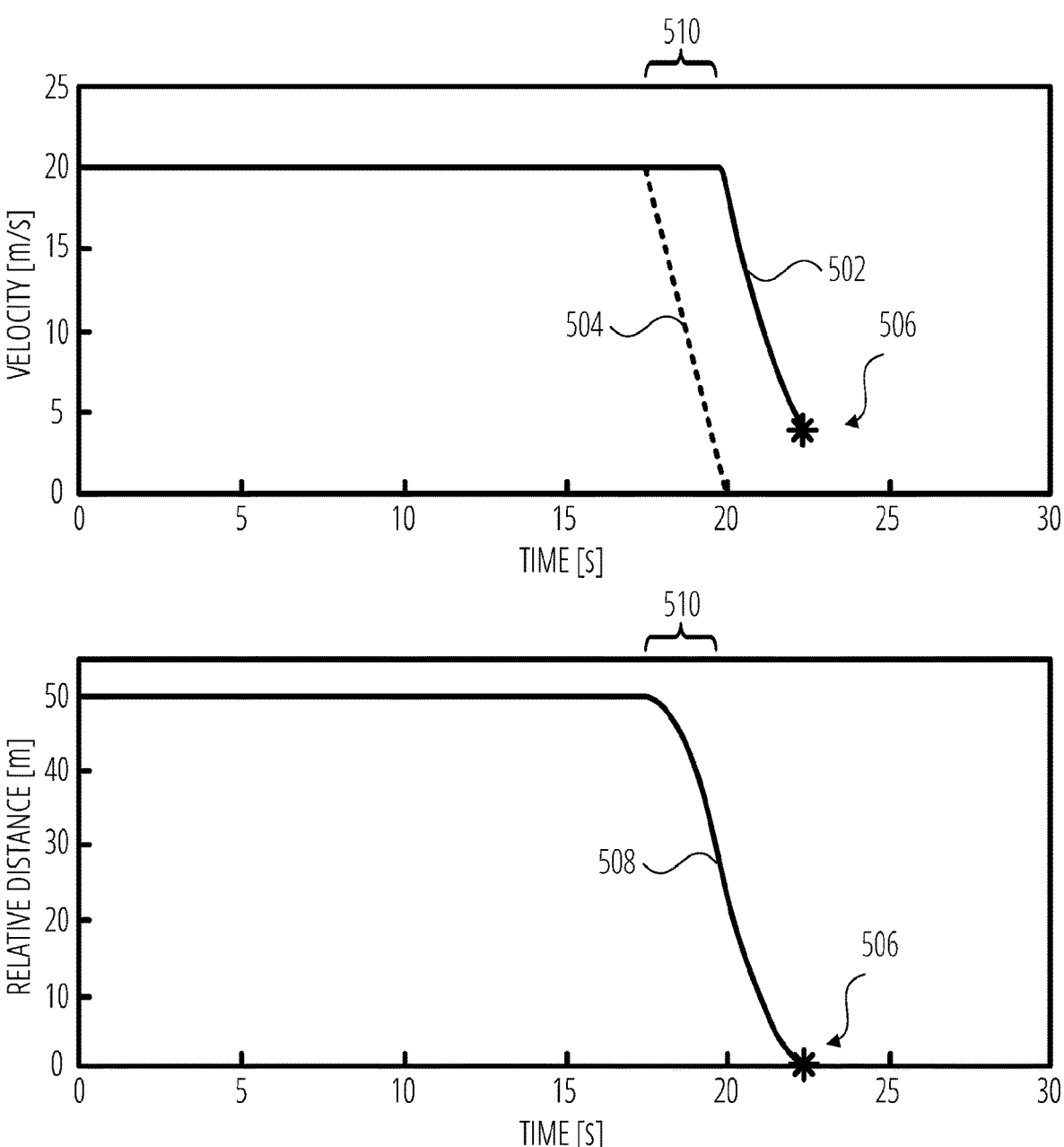
FIG. 5 illustrates a simulation result of the memory-hold technique according to various aspects of the present disclosure.

The simulation result of the above example is illustrated in FIG. 5. In FIG. 5, lines are provided for $v_0(t)$ 504, $v_1(t)$ 502, and relative distance $r_1(t)$ 508, as well as stars indicating a collision 506. The interference time 510 of 2.2 s is indicated by a bracket. Collisions can occur using the memory-hold method when the lead vehicle conducts emergency braking during interference. The ego vehicle doesn't slow down because it uses the last measured value for control during interference. Although the follower vehicle tries to take action and brake after interference, it collides with the preceding vehicle because the relative spacing is already smaller than the safety distance required for achieving a complete stop.

The CACC with the memory-hold method fails to be collision-free when the interference time exceeds the approximated safety time threshold $T_1$. Although there is some difference between the approximated braking distance function and the actual braking distance function (as illustrated in FIG. 4), this example illustrates that the memory-hold technique alone is not sufficient to guarantee vehicle-platooning safety during interference once the length of the interference becomes large (i.e., exceeds the safety time threshold). Therefore, there is a need to modify the memory-hold method to guarantee safety.

In embodiments of the present disclosure, a new occlusion-aware CACC strategy is provided to augment the memory-hold method in order to guarantee safety. The safety-speed constraint of the $i^{th}$ vehicle $v_{c,i}$ is defined as the maximum speed of the ego vehicle such that the preceding vehicle is not reachable to the follower vehicle (i.e., there are no collisions) with the current relative spacing $r_i(t)$ during interference. Therefore, from the safety condition outlined above, the safety-speed constraint $v_{c,i}$ is given as:

$$v_{c,i}(t) = \sup_{v}\{r_i(t) > d_s(v)\}.$$

Since the braking distance $d_s(v)$ is a monotonically increasing function of the velocity $v$, the equation above is equivalent to:

$$v_{c,i}(t) = \arg_{v}\{r_i(t) = d_s(v)\} = d_s^{-1}(r_i(t))$$

where $$d_s^{-1}$$

is the inverse map of the braking distance $d_s$. However, during interference, the relative spacing $r_i$ cannot be measured through onboard sensors. However it is certain that there exists a lower bound $r_{s,i}$ of its value, which could be reasoned through estimation techniques assuming that the preceding vehicle is potentially braking, as introduced below. By replacing the unmeasurable relative spacing $r_i$ with an estimate of the smallest possible spacing $r_{s,i}$, the speed constraint equation is modified as a tighter bound in order to guarantee safety for all possible values of $r_i(t)$ as $$v_{c,i}(t) = d_s^{-1}(r_{s,i}(t)) \le d_s^{-1}(r_i(t)),$$

where the last inequality follows since $$d_s^{-1}$$

is also a monotonically increasing map and $r_{s,i} \le r_i$.

The smallest-possible spacing for the $i^{th}$ vehicle $r_{s,i}$ indicates the possible relative spacing under the emergency case. It can be computed with the following assumptions: (1) under the emergency case, the preceding vehicle initiates braking with maximum deceleration $a_d$ during interference; (2) the ego vehicle has measurements on the length of its sensing range $R_i$; and (3) all of the vehicles in the platoon 202 are driving forward in one direction.

Assuming that the controller time step is h, then the smallest-possible spacing for the $i^{th}$ vehicle $r_{s,i}$ is updated iteratively at each time using the following steps:

(1) Update the smallest relative spacing $\tilde{r}_{s,i}[t+h]$ from the value of the previous step $r_{s,i}[t]$ and the estimated relative speed between the two vehicles $v_{s,i-1}[t] - v_i[t]$. Here $v_{s,i-1}[t]$ is the smallest estimation of the speed of the preceding vehicle at the previous step t:

$$\tilde{r}_{s,i}[t + h] = r_{s,i}[t] + (v_{s,i-1}[t] - v_i[t])h$$

(2) Correct the smallest estimation $\tilde{r}_{s,i}[t+h]$ by utilizing the negative information from the range of sensing $R_i[t]$ and the absence of the detection, so that the phantom vehicle is further than the range of perception $R_i[t]$ during interference.

$$r_{s,i}[t + h] = \max\{\tilde{r}_{s,i}[t + h], R_i[t + h]\}$$

(3) Update the smallest estimation of the speed of the preceding vehicle $v_{s,i}[t+h]$ by assuming it conducts an emergency brake, i.e., $$v_{s,i-1}[t + h] = \max\{v_{s,i-1}[t] - a_dh, 0\}$$

The estimates of the smallest possible spacing $r_{s,i}$ and velocity $v_{s,i-1}$ are initialized by the initial relative spacing $r_{i,0}$ and speed of the preceding vehicle $v_{i-1,0}$ (before the initiation of the interference):

$$r_{s,i}[0] = r_{i,0}$$

$$v_{s,i-1}[0] = v_{i-1,0}.$$

The speed constraint is then computed with the estimated $r_{s,i}[t]$ at each time step.

The focus of the occlusion-aware CACC is to determine the control command at the current step t such that the resulting velocity at the next step $v_i[t+h]$ is always bounded by the safety speed constraint $v_{c,i}[t+h]$. Since the safety speed constraint at the next time step $v_{c,i}[t+h]$ is a future information, its lower bound is estimated with its current value $v_{c,i}[t]$. Assuming that $v_{c,i}$ and $r_{s,i}$ are smooth and differentiable in time, it can be approximated via Taylor expansion at the step t and the chain rule:

$$v_{c,i}[t+h] = v_{c,i}[t] + h\frac{dv_{c,i}}{dt} + O(h^2)$$

$$= v_{c,i}[t] + h\frac{dv_{c,i}}{dr_{s,i}}(r_{s,i}[t])\frac{dr_{s,i}}{dt}[t] + O(h^2).$$

Expanding the derivative term of $r_{s,i}$ with the measured discrete values as:

$$\frac{dr_{s,i}}{dt}[t] = \frac{r_{s,i}[t+h] - r_{s,i}[t]}{h} + O(h).$$

Substituting this equation into the equation that precedes it and neglecting the relatively smaller higher order terms of the time step h results in:

$$v_{c,i}[t+h] \approx v_{c,i}[t] + \frac{dv_{c,i}}{dr_{s,i}}(r_{s,i}[t])(r_{s,i}[t+h] - r_{s,i}[t]).$$

The term $dv_{c,i}/dr_{s,i}$ can be computed from the equation for the safety-speed constraint with the known inverse braking distance mapping $d_s(r)$ and the estimation $r_{s,i}[t]$ computed from the equation at step (2) above. The smallest estimation $r_{s,i}[t+h]$ is bounded by, from the equations at steps (1) and (2) above:

$$r_{s,i}[t+h] - r_{s,i}[t] \geq (v_{s,i-1}[t] - v_i[t])h.$$

Finally, using the previous two equations yields a lower bound $\tilde{v}_{c,i}[t]$ on the speed constraint of the $i^{th}$ vehicle at the next step $\tilde{v}_{c,i}[t+h]$:

$$v_{c,i}[t+h] \geq v_{c,i}[t] + \frac{dv_{c,i}}{dr_{s,i}}(r_{s,i}[t])(v_{s,i-1}[t] - v_i[t])h = \tilde{v}_{c,i}[t].$$

The resulting speed constraint $\tilde{v}_{c,i}[t]$ can then be used for planning the control input $\tilde{u}_i$.

The occlusion-aware CACC strategy during interference can then be formulated based on the control law $\tilde{u}_i[t]$ and the speed constraint $\tilde{v}_{c,i}[t]$. For simplicity, the time step notation [t] of the states is ignored in the following discussion.

The occlusion-aware controller produces a control command $$u_i^*$$

as follows:

(1) If the safety constraint $\tilde{v}_{c,i}$ is not violated, the value of $\tilde{u}_i$ computed by the initial CACC law is not changed, since the design of the feedforward controller C(s) and feedback controller F(s) guarantee the CACC performance in this case (i.e., $$u_i^* = \tilde{u}_i).$$

(2) If the safety constraint $\tilde{v}_{c,i}$ will be violated in the next step by executing the command $\tilde{u}_i$, a new command $$u_i^*$$

is searched for from a candidate set $u \in \mathcal{U}$ to avoid safety violations. In this case the candidate set $\mathcal{U}$ could be the acceleration range of the vehicle. Part of the CACC performance will be a trade-off by modifying $\tilde{u}_i$ to $$u_i^*,$$

such as driving comfort. Therefore, the performance trade-off should be minimized by minimizing the difference between the new command $$u_i^*$$

and the initial command $\tilde{u}_i$.

The above two considerations indicate that the new CACC strategy can be formulated by solving a constrained optimization problem. First, given any control candidate $u \in \mathcal{U}$, the resulting velocity and acceleration at the next step could be estimated by the discrete model:

$$a_i^+ = \frac{h}{\tau}(u - a_i) + a_i$$

$$v_i^+ = v_i + a^+ h$$

where $$a_i^+ \text{ and } v_i^+$$

are the resulting states at the next step by executing the candidate command u. Second, the resulting velocity $$v_i^+$$

should be limited by the speed constraint $\tilde{v}_{c,i}$ computed by the equations above:

$$v_i^+ \le \tilde{v}_{c,i}.$$

Finally, the control objective is to minimize the quadratic error between the new command $$u_i^*$$

and the initial command $\tilde{u}_i$. Putting these equations together, provides the optimal control strategy:

$$u_i^* = \mathrm{argmin}_u(\tilde{u}_i - u)^2,$$
$$\text{s.t. } v_i^+ = v_i + a^+ h,$$
$$a_i^+ = \frac{h}{\tau}(u - a_i) + a_i,$$
$$v_i^+ \le \tilde{v}_{c,i}.$$

These equations describe a quadratic programming problem with linear constraints. Therefore, it can be solved by solving its dual problem. First the Lagrangian $\mathscr{L}(u, \underline{\lambda})$ of this problem is given as a quadratic function of u with the Lagrangian multiplier $\underline{\lambda} \ge 0$:

$$\mathscr{L}(u, \lambda) = (\tilde{u}_i - u)^2 + (\lambda k - 2\tilde{u}_i)u + \tilde{u}_i^2 + \lambda c,$$
$$k = \frac{h^2}{\tau},$$
$$c = h - \frac{h^2}{\tau}a_i + v_i - \tilde{v}_{c,i}.$$

The first optimality condition on the optimal solution $$u_i^*$$

is given by minimizing the Lagrangian $\mathscr{L}(u, \underline{\lambda})$ over u:

$$\nabla_u \mathscr{L}(u_i^*, \underline{\lambda}) = 2u_i^* + \underline{\lambda}k - 2\tilde{u}_i = 0,$$

which yields:

$$u_i^* = \tilde{u}_i - \frac{1}{2}\lambda k.$$

Another optimality condition on the optimal multiplier $\underline{\lambda}^*$ can be derived from maximizing the dual function $g(\underline{\lambda})$:

$$\lambda^* = \arg \sup_{\underline{\lambda} > 0} g(\underline{\lambda}),$$

where the dual function $g(\underline{\lambda})$ is given by plugging the first optimal condition ( $$u_i^*$$

defined above) into the Lagrangian:

$$g(\lambda) = \inf_u \mathscr{L}(u, \lambda) = -\frac{1}{4}k^2\underline{\lambda}^2 + (k\tilde{u}_i + c)\underline{\lambda} - \tilde{u}_i^2.$$

This is a concave function of $\underline{\lambda}$. Thus, maximizing the dual function $g(\underline{\lambda})$ over $\underline{\lambda} \ge 0$ yields the second optimality condition:

$$\nabla_\lambda g(\underline{\lambda}^*) = -\frac{1}{2}k^2\lambda^* + ku_i + c = 0, \text{ if } ku_i + c > 0.$$

Therefore, the optimal multiplier $\underline{\lambda}^*$ is solved as:

$$\underline{\lambda}^* = \begin{cases} \dfrac{2(ku_i + c)}{k^2}, & ku_i + c > 0 \\ 0, & ku_i + c \le 0. \end{cases}$$

Substituting this into the first optimal condition yields the optimal solution $$u_i^*:$$

$$u_i^* = \begin{cases} \dfrac{-c}{k}, & ku_i + c > 0, \\ \tilde{u}_i, & ku_i + c \le 0, \end{cases}$$
$$= \min\left\{\tilde{u}_i, -\frac{c}{k}\right\}.$$

Figure 6:
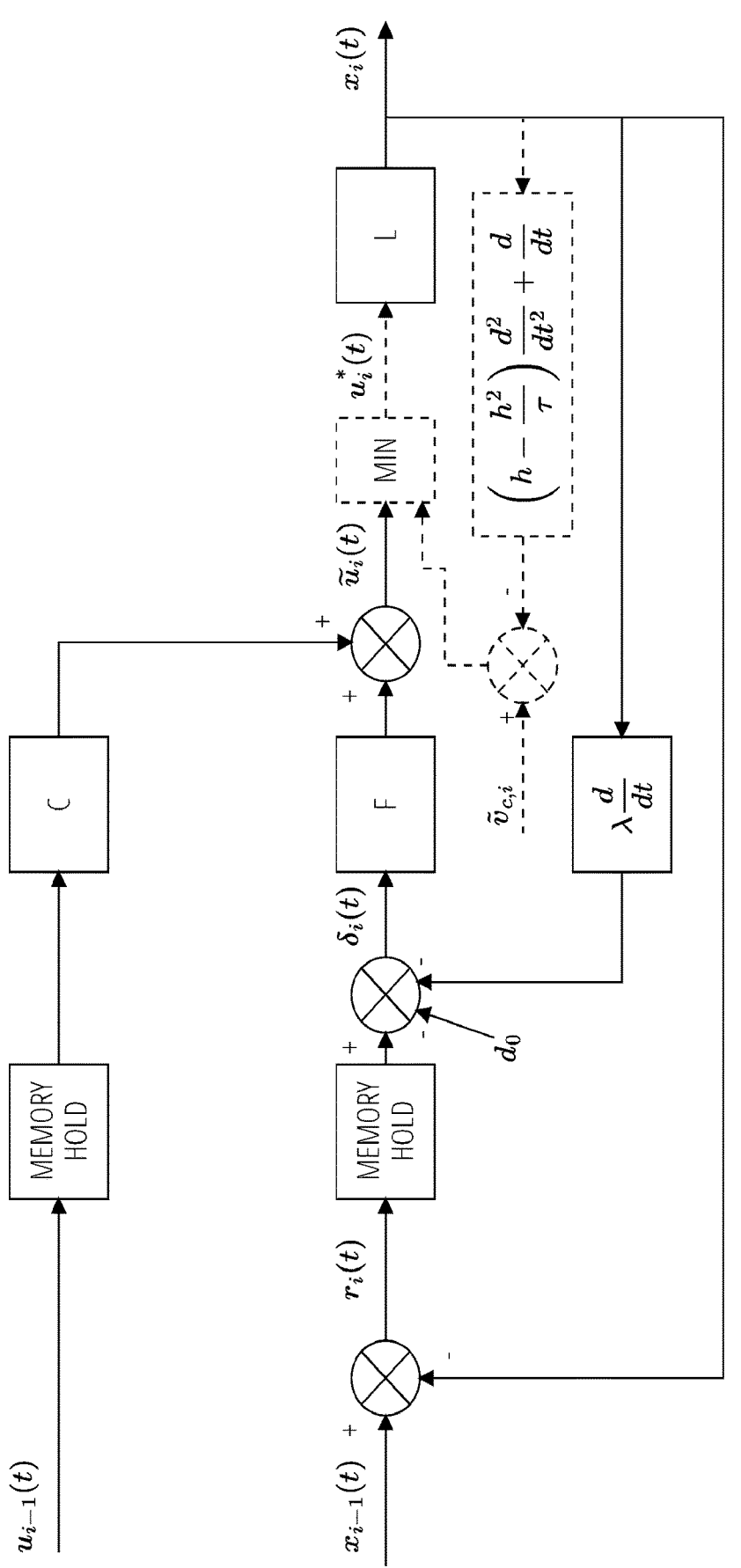
FIG. 6 is a block diagram that illustrates an occlusion-aware CACC technique according to various aspects of the present disclosure.

This equation forms the occlusion-aware CACC law during interference. In this equation, the alternative control command $$-\frac{c}{k}$$

is formulated by the speed constraint $\tilde{v}_{c,i}$ and states of the ego vehicle $v_i$, $a_i$ after plugging the coefficients k and c from the Lagrangian equations listed above. This occlusion-aware CACC strategy is illustrated in the block diagram of FIG. 6, to be compared with the CACC that uses memory-hold only from FIG. 3. In FIG. 6, the blocks related to the implementation of occlusion-aware CACC are indicated in dashed line to indicate where they have been added to the memory-hold only technique illustrated in FIG. 3. The speed constraint $\tilde{v}_{c,i}$ is computed at each time step.

FIG. 7A-FIG. 7B are a flowchart that illustrates a non-limiting example embodiment of a method of occlusion-aware cooperative adaptive cruise control according to various aspects of the present disclosure. The method 700 is an illustration of the use of the occlusion-aware CACC strategy illustrated in FIG. 6 and described in detail above.

From a start block, the method 700 proceeds to block 702, where an engine control unit (ECU 106) of an ego vehicle receives a V2V communication control message from a preceding vehicle via a V2V interface 112. In FIG. 2, the ego vehicle is the second vehicle 208 ($v_1$) and the preceding vehicle is the first vehicle 204 ($v_0$). However, in other embodiments, the ego vehicle may be any other vehicle ($v_n$) in the platoon 202, with the preceding vehicle being the vehicle in front of the ego vehicle ($v_{n-1}$). The V2V communication control message indicates a control command being implemented by the preceding vehicle in order for the ego vehicle to determine a corresponding control command.

At block 704, the ECU 106 of the ego vehicle receives relative distance information from a long-range sensor 108 of the ego vehicle. The relative distance information indicates a sensed distance between the ego vehicle and the preceding vehicle.

At block 706, the ECU 106 determines a cooperative adaptive cruise control (CACC) command based on the V2V communication control message and the relative distance information. Typically, the CACC command indicates a location at which the ego vehicle should be located. At block 708, a speed controller of the ECU 106 transmits a speed control command to a powertrain 104 of the ego vehicle based on the CACC command. As the CACC command indicates a location at which the ego vehicle should be located, the speed controller may determine whether a speed of the ego vehicle should be increased or decreased to arrive at the location, and bases the speed control command (e.g., increase engine speed, decrease engine speed, engage a brake, etc.) on this determination.

At decision block 710, a determination is made regarding whether the ego vehicle is in an occluded state. The occluded state is a state in which at least one piece of information that the CACC command is based on is not available or is not valid. For example, the occluded state could be a state in which the V2V communication control message is invalid or was not received. As another example, the occluded state could be a state in which the sensor output from the long-range sensor 108 is missing or invalid. One common instance of an occluded state occurs when the platoon 202 is traversing a curve in the roadway 206, such that line of sight between the preceding vehicle and the ego vehicle is broken. Another common instance of an occluded state occurs when sun, fog, rain, or other environmental factors interfere with the long-range sensor 108.

If it is determined that the ego vehicle is not in an occluded state, then the result of decision block 710 is NO, and the method 700 returns to block 702 to continue with the standard CACC strategy. Otherwise, if it is determined that the ego vehicle is in an occluded state, then the result of decision block 710 is YES, and the method 700 proceeds to block 712.

At block 712, the ECU 106 estimates a memory-hold speed of the preceding vehicle based on relative distance information and relative velocity information from before the occluded state. The distance and velocity information may be the values that were collected in a time step immediately preceding detection of the occluded state.

In order to avoid the safety issues of using only the memory-hold speed, the ECU 106 determines a minimum spacing value and a minimum relative velocity value in order to determine a safety speed. Accordingly, at block 714, the ECU 106 updates a minimum spacing value based on a previous spacing value and a previous relative velocity value. As above, the previous spacing value and the previous relative velocity value may be based on valid information received during a time step immediately preceding the detection of the occluded state.

The method 700 then proceeds to a continuation terminal ("terminal A"). From terminal A (FIG. 7B), the method 700 proceeds to block 716, where the ECU 106 corrects the updated minimum spacing value based on information from a short-range sensor 110 of the ego vehicle. Even though detailed ranging information may not be available from the long-range sensor 108, the short-range sensor 110 may still be able to provide enough information to allow an impact of the occlusion-aware CACC technique on the drive comfort to be minimized. In some embodiments, the updated minimum spacing value may be compared to a maximum range of the short-range sensor 110. In response to determining that the updated minimum spacing value is less than the maximum range of the short-range sensor 110, and also determining that the short-range sensor 110 does not detect the preceding vehicle, the updated minimum spacing value may be increased to be at least the maximum range of the short-range sensor 110. In other words, values from the short-range sensor 110 may be used to sanity check the updated minimum spacing value, and if the short-range sensor 110 indicates that an area in front of the ego vehicle is clear, the updated minimum spacing value may be increased to include that area. As a non-limiting example, if the updated minimum spacing value indicates a value of 10 m, but the maximum range of the short-range sensor 110 is 20 m and the short-range sensor 110 does not detect any obstacles, then the updated minimum spacing value can be increased to 20 m.

At block 718, the ECU 106 updates a minimum relative velocity value based on a previous relative velocity value and vehicle dynamics of the preceding vehicle under an emergency braking assumption. In some embodiments, this may include estimating a maximum deceleration of the preceding vehicle based on one or more of a mass, a braking efficiency, or a rolling resistance of the preceding vehicle.

At block 720, the ECU 106 determines a safety speed based on the minimum spacing value and the minimum relative velocity value. The safety speed is the occlusion-aware speed that ensures that no collisions will occur in the platoon 202 despite the occlusion.

At block 722, the ECU 106 determines an occluded adaptive cruise control command based on a minimum of the memory-hold speed and the safety speed, and at block 724, the speed controller transmits a speed control command to the powertrain 104 of the ego vehicle based on the occluded adaptive cruise control command. In some embodiments, the occluded adaptive cruise control command is determined by minimizing a difference between the occluded adaptive cruise control command and a previous command to the speed controller in order to improve driving comfort and tracking accuracy.

The method 700 then proceeds to a continuation terminal ("terminal B"), where the method 700 returns to decision block 710 to check whether the ego vehicle is still in an occluded state before determining a subsequent CACC command. The method 700 may continue as long as the ego vehicle is traveling within the platoon 202, or may be terminated at any point by driver input or a command received via the V2V interface 112.

Simulation Results

Figure 8:
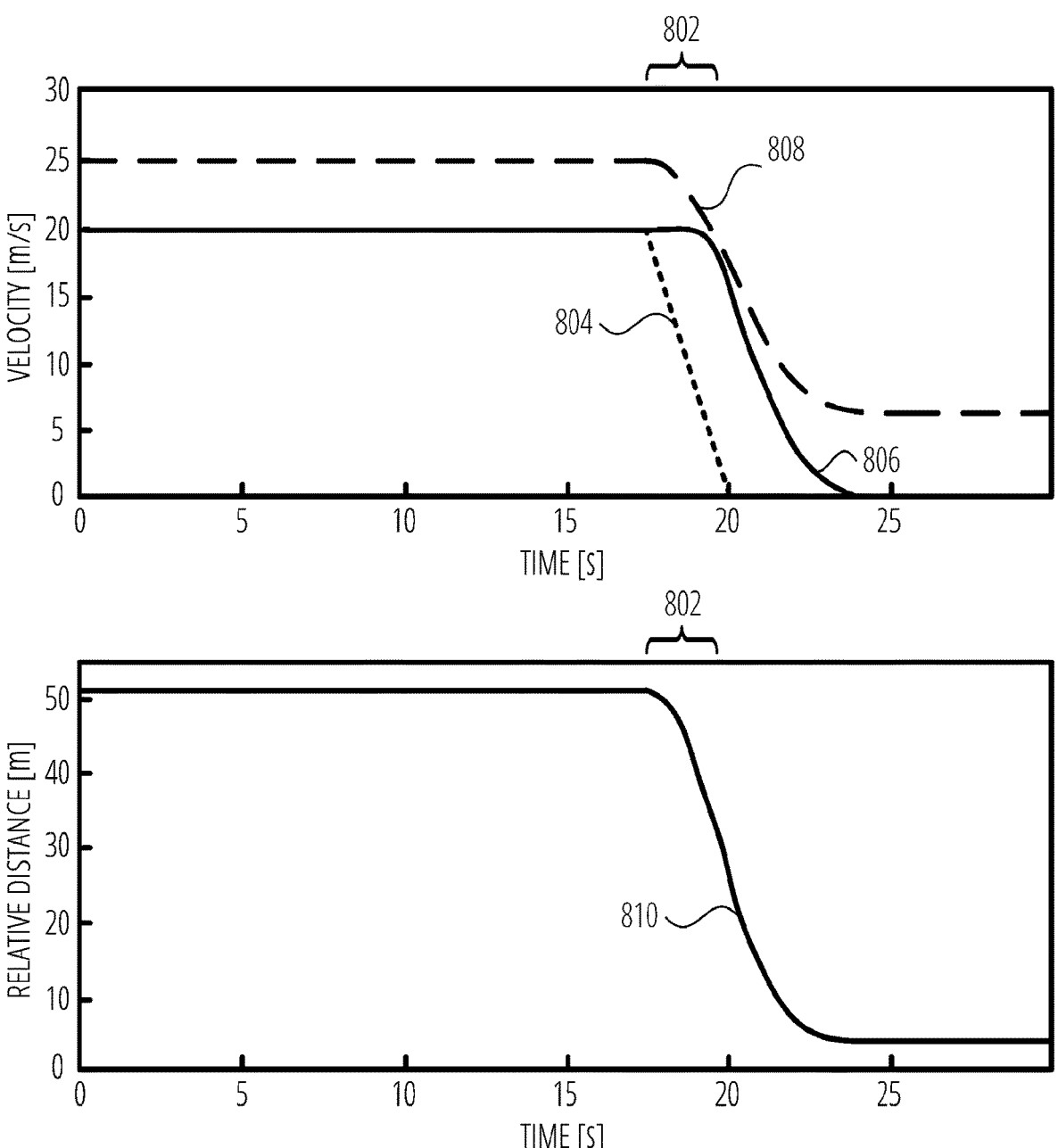

To verify if this occlusion-aware strategy improves safety, the same emergency case illustrated in FIG. 5 for the memory-hold only strategy, which was shown to fail, was used to examine the proposed technique. The simulation result is shown in FIG. 8. The parameters were the same as in the previously described test, and the range of perception was set to 0 ($R_1$=0 m) to investigate the performance of the proposed strategy under the worst environmental condition. In FIG. 8, interference time 802 of 2.2 s is indicated by a bracket. Lines are provided for $v_0(t)$ 804, $v_1(t)$ 806, $\tilde{v}_{c,1}(t)$ 808 and relative distance 810.

This chart shows that occlusion-aware control successfully avoids the collision, even under the worst environmental condition, by adjusting the speed constraint $\tilde{v}_{c,i}$. This example illustrates that the proposed method is sufficient to guarantee safety for two-vehicle platoons. Cruising with a longer platoon is more challenging since the safety conditions for the first two vehicles do not guarantee the safety of the rest of the vehicles. The proposed occlusion-aware strategy is further evaluated below using a 10-vehicle platoon simulation.

The proposed occlusion-aware CACC strategy uses an external signal $R_i(t)$, which depends on the environmental information. The performance of the occlusion-aware CACC can therefore be analyzed with respect to two environmental factors: (1) the strength of the interference $S_i$ and (2) the nominal interference time $\tilde{T}$. Both factors were examined through simulation of a two-vehicle platoon, where the follower runs the proposed occlusion-aware CACC strategy.

In order to observe the performance trade-off without considering potential risks, the lead vehicle maintains a constant speed $v_0$=20 m/s for these simulations, and all the parameters such as the headway time, clearance, and initial spacing are chosen to be the same as in the table above. Therefore, the more the follower vehicle deviates from the cruising speed of 20 m/s, the more performance (i.e., drive comfort and tracking accuracy) is traded off by the controller for ensuring safety.

Regarding strength of the interference, the strength of the interference on the $i^{th}$ vehicle $S_i$ is defined by:

$$S_i(t) = \left(1 - \frac{R_i(t)}{R_0}\right) \times 100\%,$$

where $R_0$ is the initial range of perception of the vehicle before interference. In the rest of the simulations, the initial range $R_0$ is chosen as 120 m, which is the typical range of perception for long-range radars.

Figure 9:
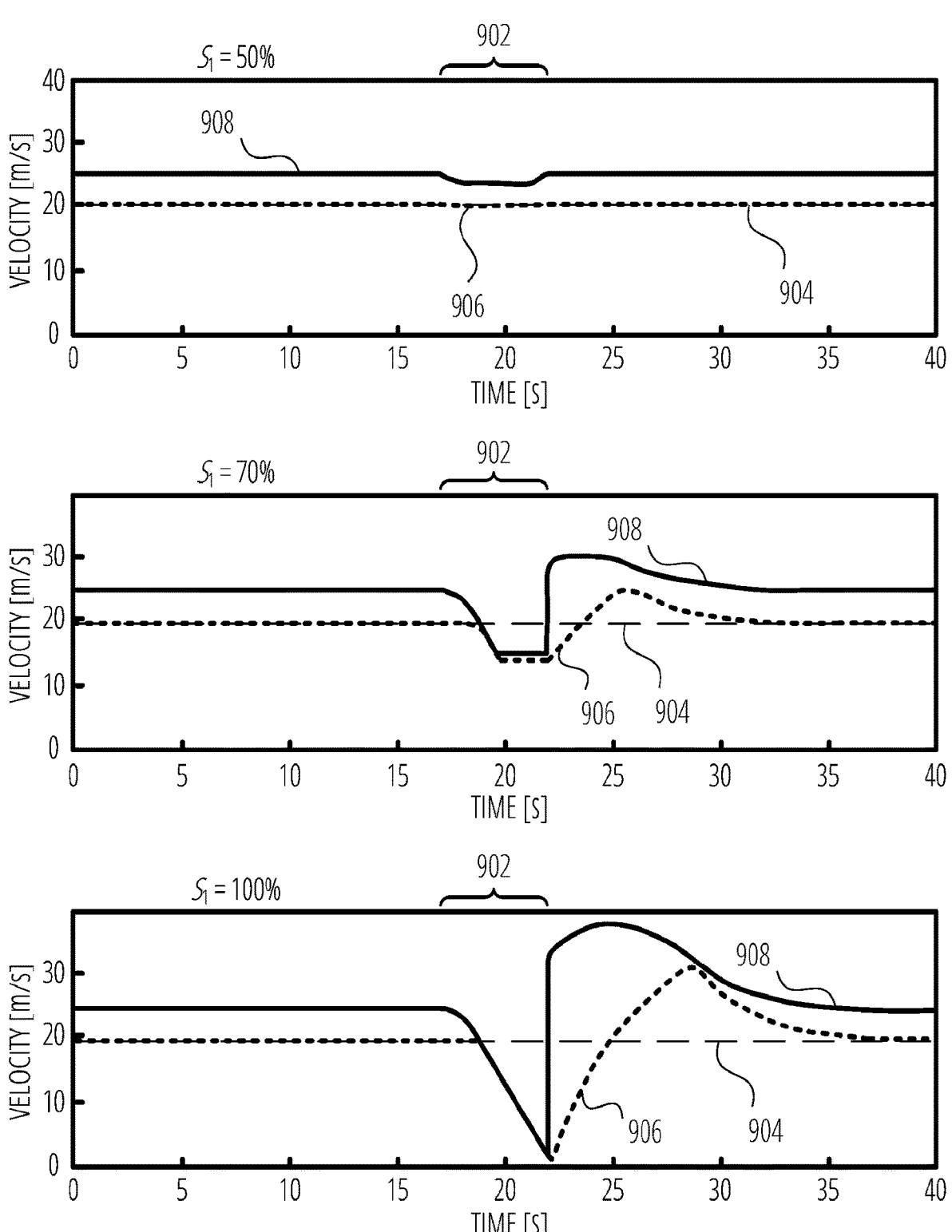

Comparative simulation results with two vehicles are given in FIG. 9 with different interference strength $S_1$ and a fixed nominal interference time $\tilde{T}$ defined as:

$$\tilde{T} = \frac{x_e - x_s}{v_{0,0}},$$

where $x_s$ and $x_e$ are the locations of the beginning and the end of interference. In the charts, lines are provided for $v_0(t)$ 904, $v_1(t)$ 906, and $v_{c,1}(t)$ 908. A time of interference 902 at varying strengths is indicated by brackets.

The results show that the occlusion-aware CACC is able to satisfy the speed constraint $\tilde{v}_{c,1}$ under various interference strengths $S_1$. However, its capability of following the preceding vehicle during interference is restricted by the strength of interference $S_1$. Larger interference strength $S_1$ causes the speed limit $v_{c,1}$ to be reduced for a longer time, which forces the ego vehicle to apply more deceleration. At the strongest interference (i.e., $S_1$=100%), the vehicle is forced to stop harshly. In this case, the tracking performance is completely traded off in order to guarantee the safety.

Regarding the nominal interference time, the nominal interference time $\tilde{T}$ defined above can be compared with the safety time threshold $T_1$ derived above. When the nominal interference time is relatively small, $T<T_1$, it indicates that the first two vehicles in the platoon are safe from collision even when using the memory-hold only method.

Figure 10:
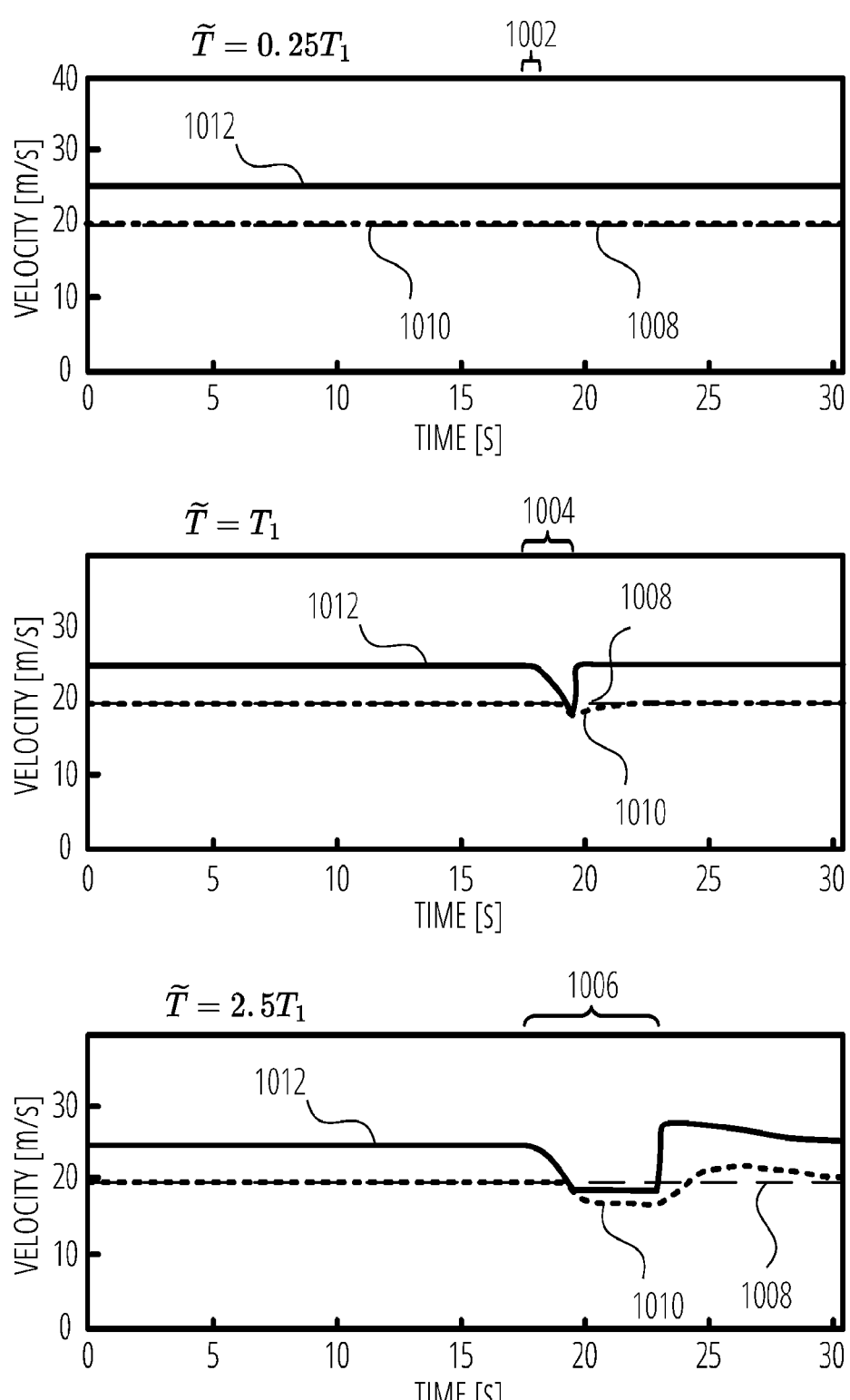

Comparative simulation results are given in FIG. 10 with different nominal interference times $\tilde{T}$ and a fixed interference strength $S_1$=70%. In the charts, lines are provided for $v_0(t)$ 1008, $v_1(t)$ 1010, and $v_{c,1}(t)$ 1012. A first interference time 1002, a second interference time 1004, and a third interference time 1006 of varying lengths are indicated by brackets.

The results show that the occlusion-aware CACC is able to guarantee that the speed constraint is satisfied regardless of the length of the nominal interference time $\tilde{T}$. No performance trade-off happens when $T<T_1$ (indicated by first interference time 1002). The proposed approach starts to apply deceleration when T is approaching $T_1$ (indicated by second interference time 1004), which is the safety threshold of whether collision could happen or not without taking action. When $\tilde{T}>T_1$ (indicated by third interference time 1006), the vehicle cruises with a speed determined by the speed constraint $\tilde{v}_{c,1}$ as described above. In this case, the performance trade-off depends on the strength of interference $S_1$.

This analysis indicates that the drive comfort could also be traded off for safety under strong environmental interference without any range of perception (i.e., no working perception sensor). This follows from the occlusion-aware CACC law, since the alternative control command c/k depends on the difference $\tilde{v}_{c,i}-v_i$, where $v_{c,i}$ depends on the range of perception from $R_i$. However, in this case the resulting trade-off of the drive comfort is desirable since the environment has introduced strong uncertainty about the preceding vehicle to the following vehicle. To ensure safety, it is more reasonable to force the following vehicle to slow down and come to a complete stop, or alert the human driver to take over, instead of sustaining the CACC strategy at speed and risking a collision.

Comparative simulations of implementing the CACC with occlusion-aware control and the memory-hold-only method were conducted to compare their safety and tracking performance using two simulation platforms: model-in-the-loop (MiL); and hardware-in-the-loop (HiL) simulation. MiL simulations were conducted on a MATLAB/Simulink platform with a standard linearized vehicle model. HiL simulations were conducted on a dSPACE mid-size simulator and a MicroAutoBox (MABx) realtime platform, with the General Motors Chevrolet Blazer vehicle model.

(A) MiL Simulation

The plant ACC model uses the benchmark model:

$$L(s) = \frac{1}{(\tau s + 1)s^2}$$

The feedback control law F(s) uses the PD controller $F(s)=C_p+C_u s$, $C(s)=1$. The communication control $C(s)$ are chosen as a low-pass pre-filter.

$$C(s) = \frac{1}{\tau_c s + 1}.$$

The controller gains and other parameters were configured as follows:

| Parameter | Value |
|---|---|
| $d_0$ | 10 m |
| $\tau$ | 0.2 |
| $\tau_c$ | 0.1 |
| $C_p$ | 4 |
| $C_u$ | 28 |
| $\lambda$ | 2 s |

To imitate the highway scenario where all of the vehicles are driving in one direction, the speed of the vehicle is restrained to be always positive. For V2V communication, no deceleration command will be sent out to other vehicles once the vehicle is completely stopped.

In order to investigate the number of collisions of the platoon, a simple collision model is implemented to describe the state of the vehicle after being rear-ended. The vehicle is expected to stop immediately after collision, and thus, the collision model is described as:

$$v_i = a_i = u_i = 0, \text{ once } r_i = 0$$

Figure 11:
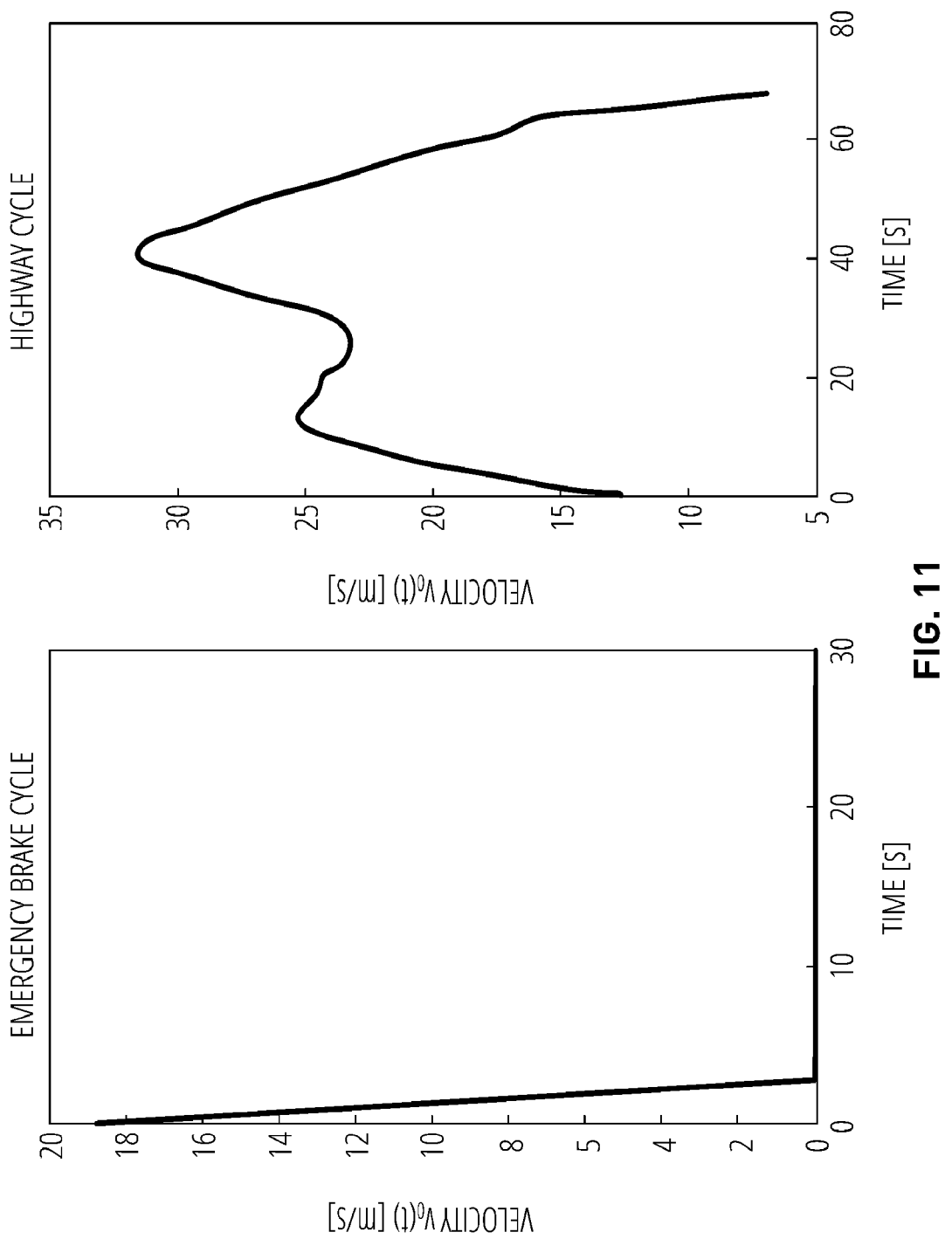

Monte Carlo simulations were performed to compare the two methods on two different scenarios: highway scenarios without any emergency braking, and the extreme case with emergency braking. FIG. 11 includes charts that illustrate time plots of the drive cycles of these two scenarios. For the emergency brake drive cycle, only the length of the interference $x_e-x_s$ is random over the drive cycle while the start of the interference $x_s$ is fixed at the beginning of the cycle. For the highway drive cycle, both the location and the length of the interference are random. The Monte Carlo simulation included 100 runs in total, with random initial spacing error $\delta_i$ within 10 meters for all the vehicles $i=1, \ldots, 10$. For all of the cases, the safety time threshold $T_1$ is computed using the equation:

$$f_1(t) = r_1(t) - d_s(v_1(t)) \leq 0$$

The nominal interference time $\tilde{T}$ is plotted with the unit of the safety time threshold $T_1$ in the safety analysis.

The simulation results show that occlusion-aware control prevents collision in all the cases, while the memory-hold method causes collision in the emergency braking case when the nominal interference time $\tilde{T}$ nears the safety time threshold $T_1$, i.e., when $\tilde{T}>0.77T_1$, as shown in the results illustrated in FIG. 12 and FIG. 13, with results that indicate collisions marked with dashed box 1202 in FIG. 12 and dashed box 1302 in FIG. 13. On the other hand, occlusion-aware CACC trades off part of the drive comfort and tracking capability, but only when the nominal interference time $\tilde{T}$ is about to exceed the safety time threshold $T_1$.

Figure 14:
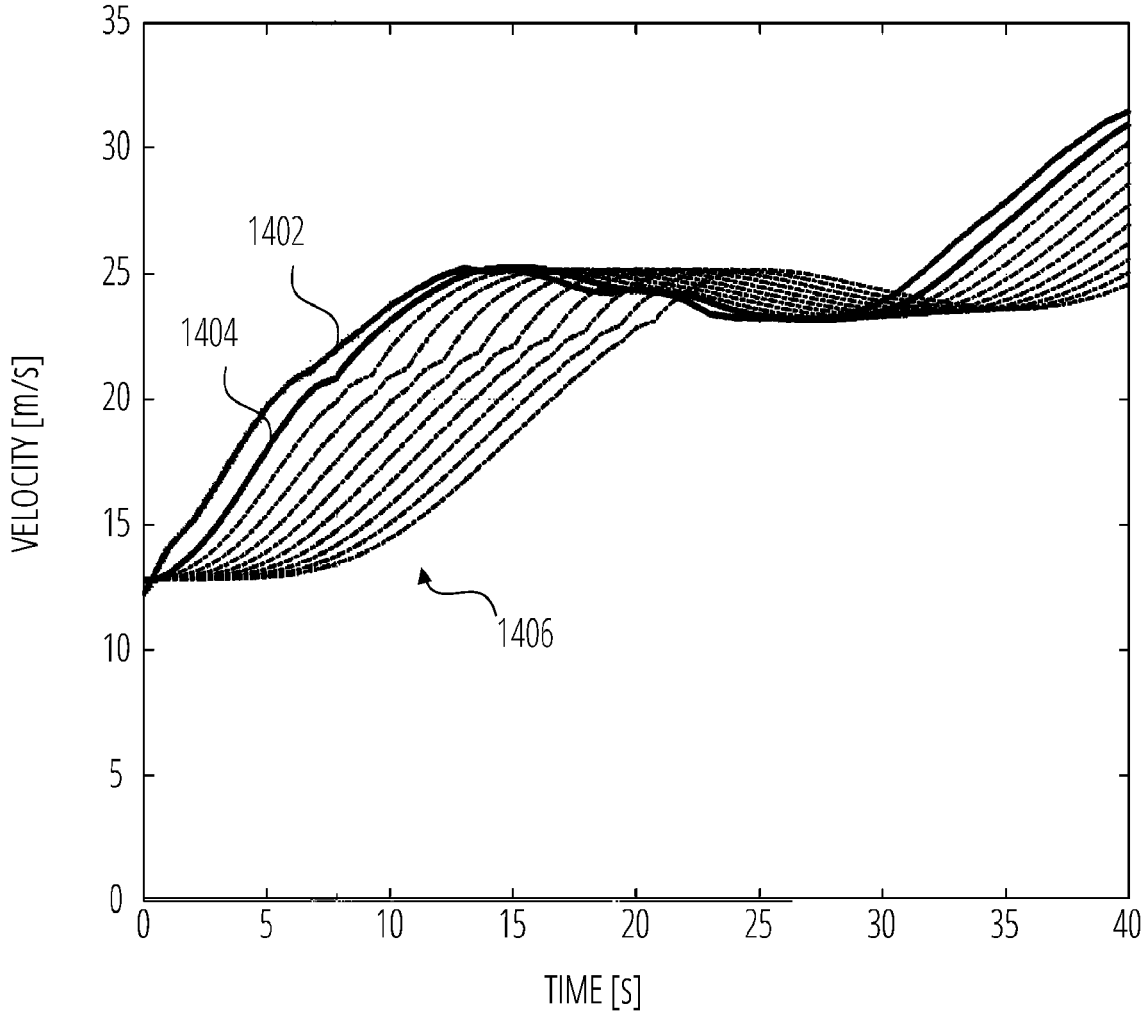

FIG. 14 and FIG. 15 provide two examples of using the memory-hold only method on the highway. FIG. 14 includes lines for $v_0$ 1402, $v_1$ 1404, and various lines for $v_2$ to $v_{10}$ 1406. Interference time is present at around the 6 second mark, and is smaller than half of the safety threshold. FIG. 15 similarly includes lines for $v_0$ 1504, $v_1$ 1506, and various lines for $v_2$ to $v_{10}$ 1508, as well as a line for the relative distance ($r_1$) between the first two vehicles 1502 and various lines 1510 for the distances between the remainder of the vehicles. The interference time in FIG. 15 is $0.9T_1$, and an emergency braking action is taken during the interference time. Collisions are indicated with stars. The approach fails with the emergency brake cycle in FIG. 15, with the fourth through the tenth vehicles colliding with their respective preceding vehicles. Moreover, the variation of the relative distance doesn't decrease monotonically, indicating that the platoon is not string stable.

In contrast, FIG. 16 illustrates the use of the occlusion-aware control under the same environmental interference scenario from FIG. 15 and the same emergency braking condition. FIG. 16 includes lines for $v_0$ 1602, $v_1$ 1604, and various lines for $v_2$ to $v_{10}$ 1606, as well as a line for the relative distance ($r_1$) between the first two vehicles 1608 and various lines 1610 for the distances between the remainder of the vehicles. FIG. 16 illustrates that the occlusion-aware control avoids collisions in the platoon under the same environmental interference scenario from FIG. 15.

In order to quantify the impact of interference on the performance, the strengths of the interference $S_i$ are set as 90% for all the simulations, which only preserves a very small visibility region for the vehicle during interference.

A comparison of maximum platoon deceleration was also performed. For each simulation case, the maximum platoon deceleration $D_m$ metric measures the maximum deceleration of the vehicles within a platoon and assesses the drive comfort. Given N vehicles in a platoon, its value is computed as:

$$D_m = \max_t \max_{i=1,\ldots,N} \{a_i(t)\}$$

FIG. 12 and FIG. 17 compare the maximum platoon deceleration performance of the two methods (with and without the occlusion-aware control) on the two scenarios: highway and emergency braking. The results show that occlusion-aware control guarantees safety in all the cases of both scenarios, but has a lower driver comfort performance than using the memory-hold only method.

In the highway scenario (FIG. 17), when the nominal interference time ratio $\tilde{T}/T_1<0.8$, which indicates the first two vehicles don't have a risk for collision, occlusion-aware CACC has an equivalent level of drive comfort as the memory-hold technique. When $\tilde{T}/T_1>1$, which indicates a potential safety hazard for the first two vehicles, occlusion-aware CACC starts to trade off the drive comfort by applying deceleration. In this case, the trade-off is amplified when the interference distance increases. However, in the emergency braking cycle, occlusion-aware control guarantees collision-free operation for the whole platoon in all the test cases, whereas using the memory-hold method causes collisions when the nominal interference time ratio $\tilde{T}/T_1>0.77$. Collision happens earlier than the predicted safety time threshold (i.e. $\tilde{T}/T_1=1$), which indicates that vehicles in the middle or the end of the platoon collide earlier than the first two. This shows that the vehicle platoon is not string stable in this case as the relative spacing error starts to become amplified along the platoon. This string instability is also revealed in the example given in FIG. 15.

A comparison of maximum platoon spacing error was also performed. For each simulation case, the maximum spacing error $S_m$ metric measures the maximum absolute spacing error of the vehicles within a platoon and assesses the tracking performance. Given N vehicles in a platoon, its value is computed by:

$$S_m = \max_t \max_{i=1,\dots,N} \{\delta_i(t)\}$$

FIG. 13 and FIG. 18 compare the maximum spacing error of the two methods (with and without the collision-aware control) on both scenarios: highway and emergency braking. The results show that occlusion-aware control only trades off the tracking ability when the safety conditions are offended ($\tilde{T}/T_1 > 1$).

In the highway scenario (FIG. 18), when the nominal interference time ratio $\tilde{T}/T_1 < 1$, the tracking capability between the two methods are identical. When $\tilde{T}/T_1 < 1$, occlusion-aware CACC has about 60% of the cases which trade off the tracking capability in order to satisfy the safety constraint, as the level of the spacing error is higher than using the memory-hold only technique. The increase of the spacing error is caused by constraining the speed according to the speed constraint $\tilde{v}_{c,i}$, as FIG. 9 and FIG. 10 illustrate.

Similar to the situation in maximum deceleration $D_m$, the trade-off is amplified as the interference distance $x_e - x_s$ increases. However, it could be considered as a proper reaction as the vehicles cannot safely continue platooning without slowing down under this scenario. In the emergency braking cycle, the occlusion-aware CACC outperforms the memory-hold only method, since it guarantees safety and causes smaller max spacing error $S_m$.

(B) HiL Simulation

HiL simulations were performed using similar conditions as the MiL simulations described above to further evaluate the proposed technique. Compared with MiL, HiL simulations provide a more realistic vehicular environment that includes controller area network (CAN) transmission, electronic control unit (ECU) connections, high fidelity models, and human participation during testing. The goal is to examine whether the proposed CACC algorithm could prevent collisions within the platoon under these more realistic driving conditions.

The HiL simulations are performed on a dSPACE midsize simulator and the MABx platform. The simulator loads the platoon model with the first two vehicles. The states of the lead vehicle and the follower vehicle are simulated by a GM Chevrolet Blazer model. The simulation drive cycles are illustrated in FIG. 19 to comparatively evaluate the results from the high-fidelity HiL model and the simplified dynamics L(s) described above. The simulator also loads the environmental model which simulates the measurement of the relative distance $r_1$ and the wireless communication command $u_0$. The high-fidelity model used in HiL simulation results are overall similar to the results from using the standard simplified model L(s). However, the high-fidelity HiL predictions are closer than the standard model L(s) predictions to the experimental velocity data from an actual vehicle for the same driver inputs (i.e., the accelerator and brake pedal input collected from the driver).

The CACC techniques are implemented on the MABx platform, which receives the above measurements and the required feedback from the follower vehicle model such as the velocity $v_1$ and acceleration $a_1$. The MABx also outputs the acceleration command ( $$u_1^*$$

or $\tilde{u}_i$) for the follower vehicle model. The two platforms are connected through CAN communication.

The interference is introduced by inserting an acknowledgement CAN error through the simulator. When the error is inserted, the CAN packets will be dropped out which contains the measurements $r_1$ and the wireless communication command $u_0$. In this procedure the CACC controller won't receive any information about the lead vehicle, and the CAN status will become invalid when the error is inserted. Therefore, the perception range of the follower vehicle $R_1$ is set as 0 when the interference happens.

The HiL simulations were used to assess the performance under the emergency braking scenario. To imitate a real driving scenario, the lead vehicle model is controlled by a human participant. When the simulation starts, the human driver accelerates and cruises the vehicle with a speed greater then 45 mph through a joystick accelerator. The CAN fault injection is triggered by the simulation timer, and the nominal interference time $\tilde{T}$ is preset. After the interference happens, the human driver immediately commands the emergency brake through a joystick brake pedal. The parameters are the same as in the dynamics equations provided above, except that the lead vehicle is controlled by a human instead of by the simulation. This scenario allows an assessment of the safety time threshold $T_1$ computed by the equations above as well as the ability to maintain safety with the proposed occlusion-aware CACC technique disclosed herein.

Figure 20:
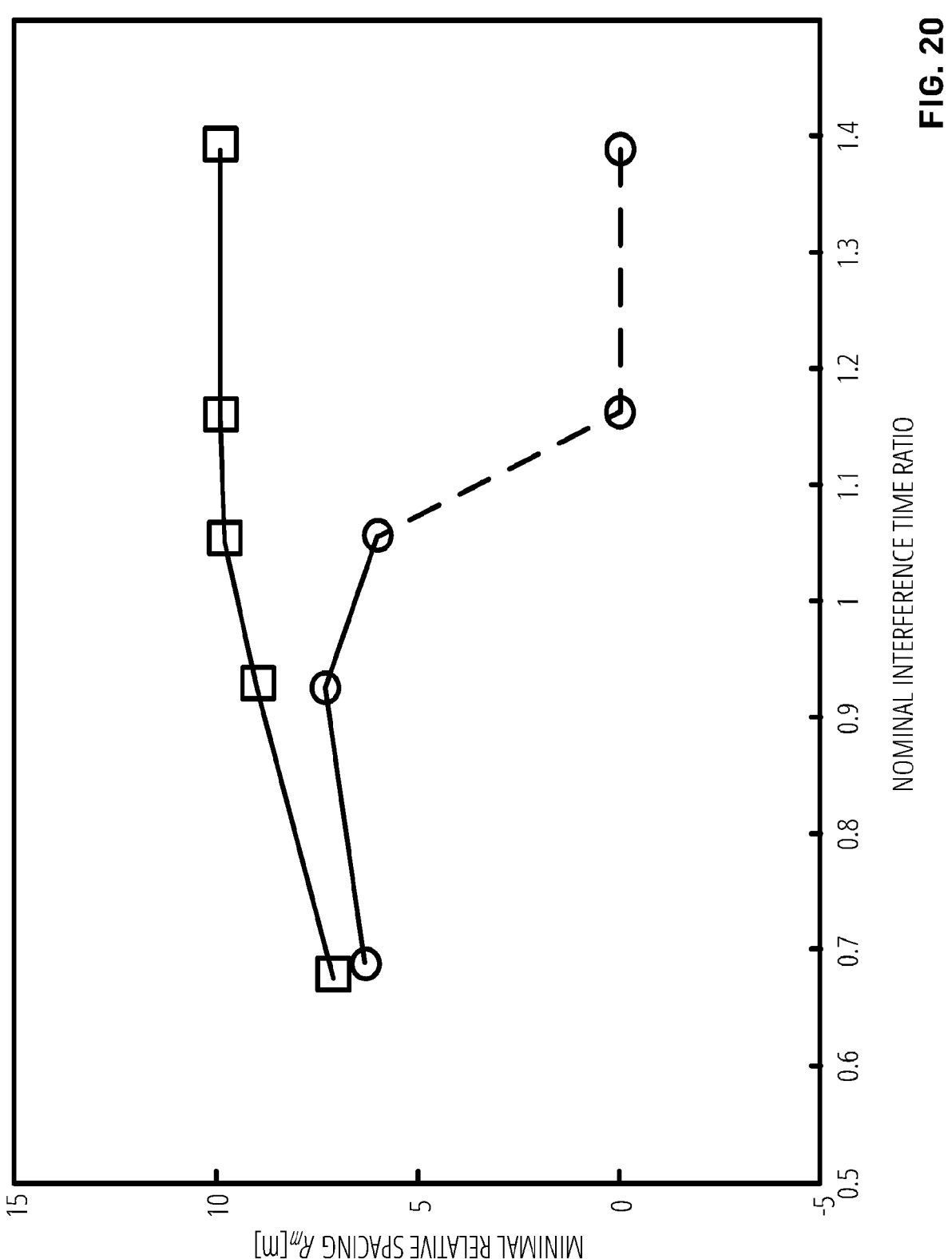

Comparative examples of HiL simulations with and without the occlusion-aware control are given in FIG. 20. The line marked with squares indicates the occlusion-aware control results, and the line marked with circles indicates the memory-hold only control results. Simulations in which a collision occurs are indicated with the dotted line.

The result shows that the occlusion-aware control prevents collision in the emergency braking cases. In contrast, the vehicles can collide when using memory-hold only method. In order to compare the performance difference between the two methods, the minimal relative distance $R_m$ of each test, defined by $$R_m = \min_t r_i(t),$$

is provided in FIG. 20. When the nominal interference time is small, $\tilde{T}=0.69T_1$, the difference of the minimal relative distance $R_m$ between the two methods is less than 5%, which indicates that the reactions of the vehicle to the emergency braking case are very similar. The difference of performance increases as the ratio $\tilde{T}/T_1$ increases: occlusion-aware control requests more deceleration to maintain a safety gap as the nominal interference time $\tilde{T}$ approaches and exceeds the safety time threshold $T_1$.

The HiL simulation results show that safety is maintained in all cases with the proposed occlusion-aware control. The HiL simulations match the prediction of the safety time threshold $$T_1 = \min_t \{f_1(t) \le 0\}$$

except for one case with $\tilde{T}=1.06T_1$. According to the safe time threshold $T_1$, in this case the follower vehicle is under the risk of collision when only using the memory-hold method in CACC. However, collision doesn't happen when the lead vehicle conducts an emergency braking in this case. The difference between the estimated vehicle dynamics and the GM Chevrolet Blazer model could cause this variation in prediction of the safety time threshold $\tilde{T}$ in the equation above in the HiL simulations. Moreover, the predicted time threshold assumes that the deceleration of the preceding vehicle reaches its maximum value $a_d$ immediately after interference and is therefore expected to be more conservative compared to the HiL simulations due to time taken for the preceding-vehicle deceleration to achieve its maximum value. Additionally, another possible reason is the delayed reaction time of the human driver (which can be as large as 0.2-0.4 secs) when commanding emergency brake during the HiL simulation.

Figure 21:
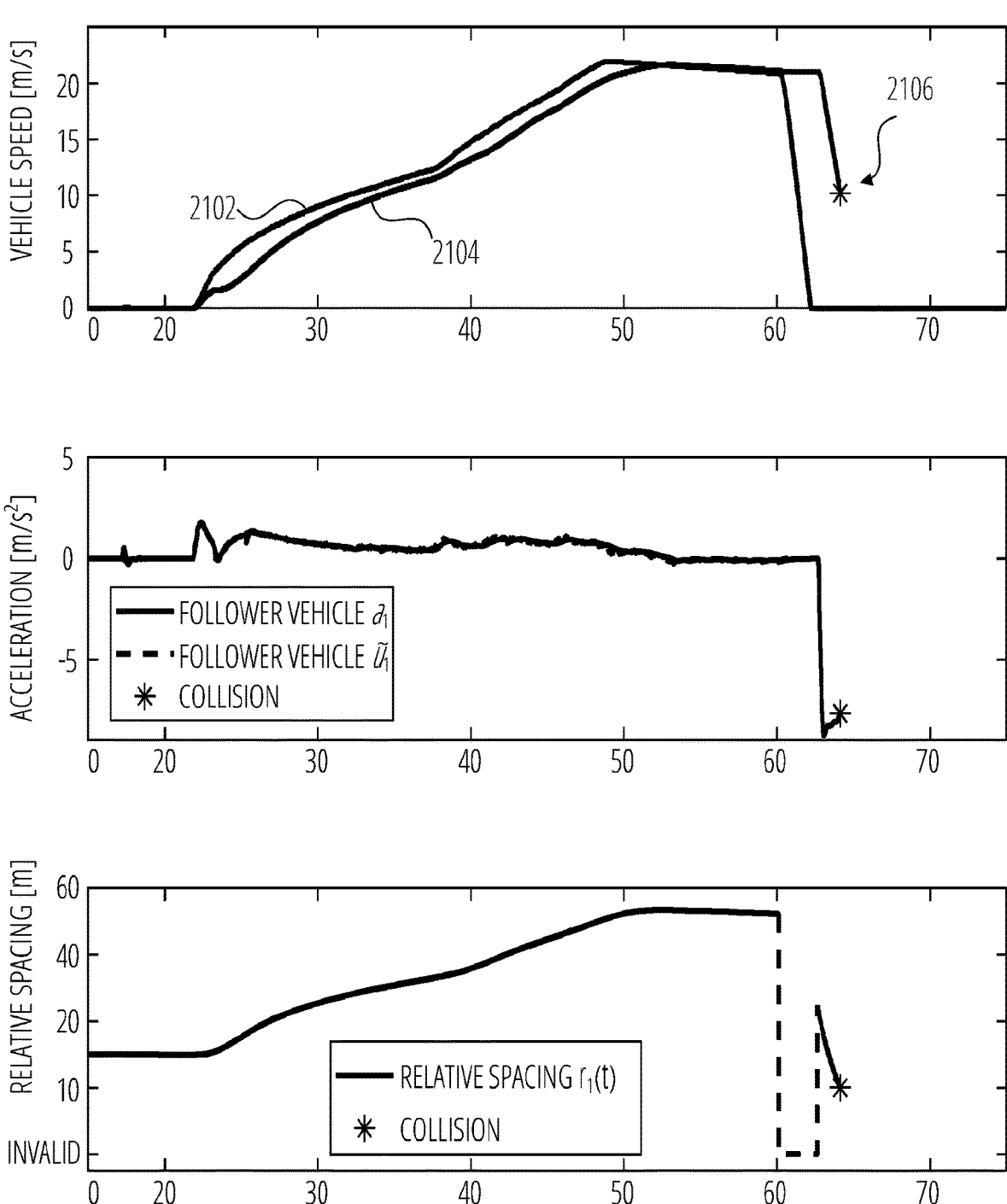
Figure 22:
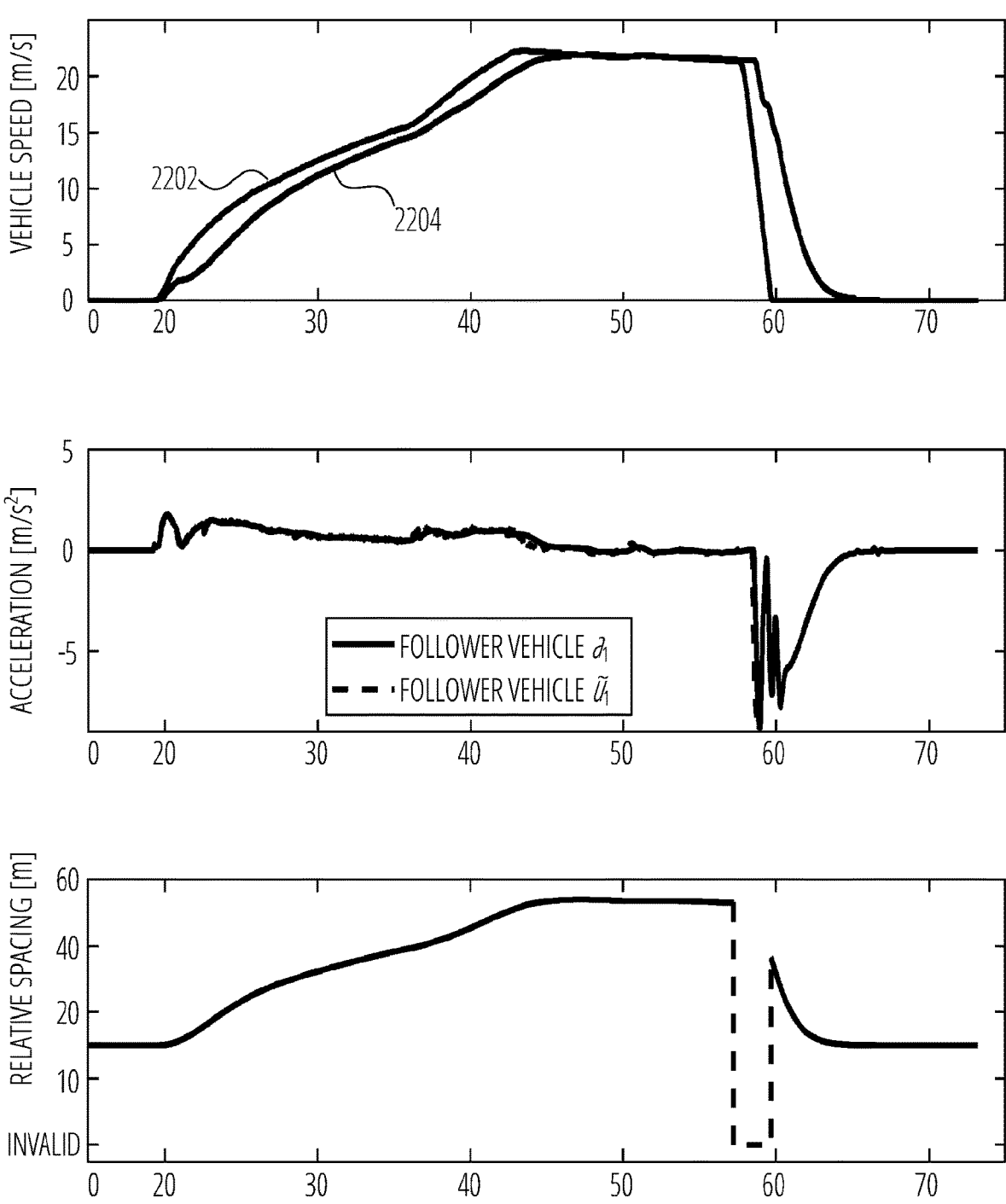

Comparative examples are provided in FIG. 21 and FIG. 22, which show that the occlusion-aware technique avoids collision while using the memory-hold only technique causes collision under the same nominal interference time $\tilde{T}=2.5$ seconds. In FIG. 21, the memory-hold only technique is shown, while in FIG. 22, the occlusion-aware technique is shown. In FIG. 21, lines are provided for the lead vehicle 2102 and the follower vehicle 2104, with a collision 2106 indicated with a star. FIG. 22 likewise includes lines for the lead vehicle 2202 and the follower vehicle 2204, and shows that no collision occurs.

While illustrative embodiments have been illustrated and described, it will be appreciated that various changes can be made therein without departing from the spirit and scope of the invention.

The invention claimed is:

1. A method of controlling speed of an ego vehicle in a vehicle platoon that includes a preceding vehicle and the ego vehicle, the method comprising:

providing cooperative adaptive cruise control (CACC) commands to a speed controller, wherein the CACC commands are based on at least one of a vehicle-to-vehicle (V2V) communication control received via a wireless communication from the preceding vehicle and a feedback control based on a sensor output of a long-range sensor of the ego vehicle; and in response to detecting an occluded state:

determining a minimum spacing value and a minimum relative velocity value between the ego vehicle and the preceding vehicle based on information received before the detection of the occluded state;

determining a safety speed based on the minimum spacing value and the minimum relative velocity value; and providing an occluded adaptive cruise control command to the speed controller to maintain a speed of the ego vehicle that is less than or equal to the safety speed;

wherein detecting the occluded state includes at least one of:

detecting a missing or invalid V2V communication control; or detecting a missing or invalid sensor output from the long-range sensor.

2. The method of claim 1, further comprising, in response to the detection of the occluded state, estimating a memory-hold speed of the preceding vehicle using a memory-hold technique based on last information received before the detection of the occluded state; and wherein providing the occluded adaptive cruise control command to the speed controller to maintain the speed of the ego vehicle that is less than or equal to the safety speed includes:

determining the occluded adaptive cruise control command based on a minimum of the memory-hold speed and the safety speed.

3. The method of claim 1, wherein determining the minimum spacing value and the minimum relative velocity value between the ego vehicle and the preceding vehicle includes:

updating a minimum spacing value based on a previous spacing value and a previous relative velocity value;

correcting the updated minimum spacing value based on information from a short-range sensor of the ego vehicle; and updating the minimum relative velocity value based on the previous relative velocity value and vehicle dynamics of the preceding vehicle under an emergency braking assumption.

4. The method of claim 3, wherein correcting the updated minimum spacing value based on information from the short-range sensor of the ego vehicle includes:

comparing the updated minimum spacing value to a maximum range of the short-range sensor; and in response to determining that the updated minimum spacing value is less than the maximum range of the short-range sensor and that the short-range sensor does not detect the preceding vehicle, increasing the updated minimum spacing value to be at least the maximum range of the short-range sensor.

5. The method of claim 3, wherein updating the minimum relative velocity value based on the previous relative velocity value and vehicle dynamics of the preceding vehicle under the emergency braking assumption includes estimating a maximum deceleration of the preceding vehicle based on one or more of a mass, a braking efficiency, or a rolling resistance of the preceding vehicle.

6. The method of claim 1, wherein providing the occluded adaptive cruise control command to the speed controller to maintain the speed of the ego vehicle that is less than or equal to the safety speed includes minimizing a difference between the occluded adaptive cruise control command and a previous command to the speed controller to improve driving comfort and tracking accuracy.

7. A non-transitory computer-readable medium having computer-executable instructions stored thereon that, in response to execution by an engine control unit (ECU) of an ego vehicle, cause the ECU to perform actions to control speed of the ego vehicle while in a vehicle platoon that includes a preceding vehicle and the ego vehicle, the actions comprising:

providing cooperative adaptive cruise control (CACC) commands to a speed controller, wherein the CACC commands are based on at least one of a vehicle-to-vehicle (V2V) communication control received via a wireless communication from the preceding vehicle and a feedback control based on a sensor output of a long-range sensor of the ego vehicle; and in response to detecting an occluded state:

determining a minimum spacing value and a minimum relative velocity value between the ego vehicle and the preceding vehicle based on information received before the detection of the occluded state;

determining a safety speed based on the minimum spacing value and the minimum relative velocity value; and providing an occluded adaptive cruise control command to the speed controller to maintain a speed of the ego vehicle that is less than or equal to the safety speed;

wherein detecting the occluded state includes at least one of:

detecting a missing or invalid V2V communication control; or detecting a missing or invalid sensor output from the long-range sensor.

8. The non-transitory computer-readable medium of claim 7, wherein the actions further comprise, in response to the detection of the occluded state, estimating a memory-hold speed of the preceding vehicle using a memory-hold technique based on last information received before the detection of the occluded state; and wherein providing the occluded adaptive cruise control command to the speed controller to maintain the speed of the ego vehicle that is less than or equal to the safety speed includes:

determining the occluded adaptive cruise control command based on a minimum of the memory-hold speed and the safety speed.

9. The non-transitory computer-readable medium of claim 7, wherein determining the minimum spacing value and the minimum relative velocity value between the ego vehicle and the preceding vehicle includes:

updating a minimum spacing value based on a previous spacing value and a previous relative velocity value;

correcting the updated minimum spacing value based on information from a short-range sensor of the ego vehicle; and updating the minimum relative velocity value based on the previous relative velocity value and vehicle dynamics of the preceding vehicle under an emergency braking assumption.

10. The non-transitory computer-readable medium of claim 9, wherein correcting the updated minimum spacing value based on information from the short-range sensor of the ego vehicle includes:

comparing the updated minimum spacing value to a maximum range of the short-range sensor; and in response to determining that the updated minimum spacing value is less than the maximum range of the short-range sensor and that the short-range sensor does not detect the preceding vehicle, increasing the updated minimum spacing value to be at least the maximum range of the short-range sensor.

11. The non-transitory computer-readable medium of claim 9, wherein updating the minimum relative velocity value based on the previous relative velocity value and vehicle dynamics of the preceding vehicle under the emergency braking assumption includes estimating a maximum deceleration of the preceding vehicle based on one or more of a mass, a braking efficiency, or a rolling resistance of the preceding vehicle.

12. The non-transitory computer-readable medium of claim 7, wherein providing the occluded adaptive cruise control command to the speed controller to maintain the speed of the ego vehicle that is less than or equal to the safety speed includes minimizing a difference between the occluded adaptive cruise control command and a previous command to the speed controller to improve driving comfort and tracking accuracy.

13. A vehicle, comprising:

a long-range sensor;

a vehicle-to-vehicle (V2V) wireless interface;

a short-range sensor; and an engine control unit (ECU);

wherein the ECU includes a speed controller and is communicatively coupled to the long-range sensor, the V2V wireless interface, and the short-range sensor; and wherein the ECU is configured to perform a method for controlling speed of the vehicle as an ego vehicle in a vehicle platoon that includes the vehicle and a preceding vehicle, the method comprising:

providing cooperative adaptive cruise control (CACC) commands to the speed controller, wherein the CACC commands are based on at least one of a vehicle-to-vehicle (V2V) communication control received via a wireless communication from the preceding vehicle and a feedback control based on a sensor output of the long-range sensor; and in response to detecting an occluded state:

determining a minimum spacing value and a minimum relative velocity value between the ego vehicle and the preceding vehicle based on information received before the detection of the occluded state;

determining a safety speed based on the minimum spacing value and the minimum relative velocity value; and providing an occluded adaptive cruise control command to the speed controller to maintain a speed of the ego vehicle that is less than or equal to the safety speed;

wherein detecting the occluded state includes at least one of:

detecting a missing or invalid V2V communication control; or detecting a missing or invalid sensor output from the long-range sensor.

14. The vehicle of claim 13, wherein the long-range sensor includes at least one of a radar sensor and a camera.

15. The vehicle of claim 13, wherein the short-range sensor includes a radar sensor.

16. The vehicle of claim 13, wherein the method further comprises, in response to the detection of the occluded state, estimating a memory-hold speed of the preceding vehicle using a memory-hold technique based on last information received before the detection of the occluded state; and wherein providing the occluded adaptive cruise control command to the speed controller to maintain the speed of the ego vehicle that is less than or equal to the safety speed includes:

determining the occluded adaptive cruise control command based on a minimum of the memory-hold speed and the safety speed.

17. The vehicle of claim 13, wherein determining the minimum spacing value and the minimum relative velocity value between the ego vehicle and the preceding vehicle includes:

updating a minimum spacing value based on a previous spacing value and a previous relative velocity value;

correcting the updated minimum spacing value based on information from a short-range sensor of the ego vehicle; and updating the minimum relative velocity value based on the previous relative velocity value and vehicle dynamics of the preceding vehicle under an emergency braking assumption.

\* \* \* \* \*